US011522691B2

(12) United States Patent
Johnson et al.

(10) Patent No.: US 11,522,691 B2
(45) Date of Patent: Dec. 6, 2022

(54) TECHNIQUES FOR VIRTUAL CRYPTOGRAPHIC KEY CEREMONIES

(71) Applicant: salesforce.com, inc., San Francisco, CA (US)

(72) Inventors: Aaron Johnson, Fayetteville, AR (US); Christopher Pylypko, Herndon, VA (US); William Johnson, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 25 days.

(21) Appl. No.: 17/157,843

(22) Filed: Jan. 25, 2021

(65) Prior Publication Data

US 2022/0123929 A1    Apr. 21, 2022

Related U.S. Application Data

(60) Provisional application No. 63/092,495, filed on Oct. 15, 2020.

(51) Int. Cl.
| | |
|---|---|
| *H04L 29/06* | (2006.01) |
| *G06F 21/00* | (2013.01) |
| *H04L 9/08* | (2006.01) |
| *H04L 9/32* | (2006.01) |
| *H04L 9/30* | (2006.01) |
| *G06F 9/455* | (2018.01) |

(52) U.S. Cl.
CPC ........ *H04L 9/0863* (2013.01); *G06F 9/45558* (2013.01); *H04L 9/085* (2013.01); *H04L 9/0825* (2013.01); *H04L 9/302* (2013.01); *H04L 9/3066* (2013.01); *H04L 9/3226* (2013.01); *H04L 9/3263* (2013.01); *G06F 2009/45587* (2013.01); *G06F 2009/45595* (2013.01)

(58) Field of Classification Search
CPC ..... H04L 9/0863; H04L 9/0825; H04L 9/085; H04L 9/302; H04L 9/3066; H04L 9/3226; H04L 9/3263; G06F 9/45558; G06F 2009/45587; G06F 2009/45595
See application file for complete search history.

(56) References Cited

U.S. PATENT DOCUMENTS

| | | | |
|---|---|---|---|
| 2015/0271157 A1* | 9/2015 | Ronca ................... | H04L 9/0819 713/168 |
| 2015/0271158 A1* | 9/2015 | Ronca ................... | H04L 63/06 713/168 |
| 2020/0111080 A1* | 4/2020 | Metcalfe ............ | G06Q 20/3226 |

* cited by examiner

*Primary Examiner* — Lisa C Lewis
(74) *Attorney, Agent, or Firm* — Holland & Hart LLP

(57) ABSTRACT

Methods, systems, and devices supporting virtual cryptographic key ceremonies are described. A server may receive a plurality of public keys and a plurality of digital signatures comprising data encrypted using a plurality of private keys, where each private key of the plurality of private keys corresponds to a respective public key of the plurality of public keys. The server may generate a quorum token based on the plurality of signatures and the plurality of public keys, where generating the quorum token is based on the plurality of signatures representing at least a threshold number of pools. The server may receive a plurality of encrypted shares associated with respective pools of a plurality of pools, generate a master wrapping key based on generating the quorum token and receiving the plurality of encrypted shares, unwrap a root key using the master wrapping key, and generate a certificate based on the root key.

20 Claims, 23 Drawing Sheets

TECHNIQUES FOR VIRTUAL CRYPTOGRAPHIC KEY CEREMONIES

CROSS-REFERENCE

The present Application for Patent claims the benefit of U.S. Provisional Patent Application No. 63/092,495 by Johnson et al., entitled "SYSTEMS AND CONTROLS FOR HIGH ASSURANCE VIRTUAL KEY CEREMONIES," filed Oct. 15, 2020, assigned to the assignee hereof, and expressly incorporated by reference herein.

FIELD OF TECHNOLOGY

The present disclosure relates generally to database systems and data processing, and more specifically to techniques for virtual cryptographic key ceremonies.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Cryptographic key management solutions establish their root of trust through cryptographic key ceremonies. Traditionally, these ceremonies are conducted within a secured facility by multiple, in-person key custodians. In some scenarios, it may be challenging or impossible to have multiple in-person key custodians to perform a cryptographic key ceremony.

DETAILED DESCRIPTION

Figure 1:
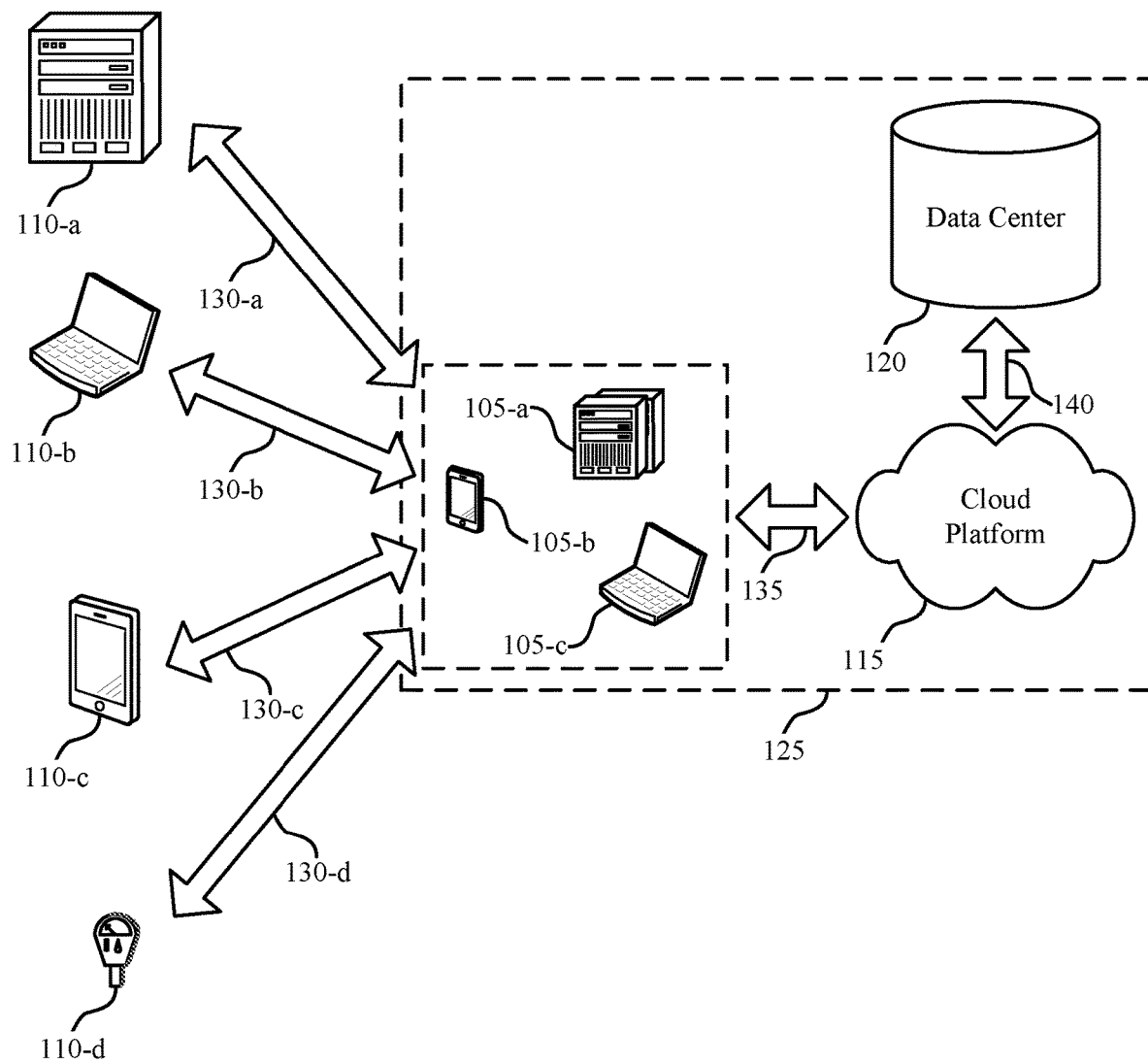
FIG. 1 illustrates an example of a key management system that supports techniques for virtual cryptographic key ceremonies in accordance with aspects of the present disclosure.

Some cryptographic key management systems use in-person key ceremonies for creating or accessing cryptographic keys. For example, a secure facility may be used to host an in-person key ceremony, and multiple key custodians (e.g., cryptography officers) may meet at the secure facility to create, access, or modify one or more cryptographic keys. However, in-person key ceremonies may not be possible or desirable in some scenarios. For example, key custodians may live in distant geographic regions or some key custodians may be ill, which may, in some cases, make in-person ceremonies imprudent or impossible. The techniques described herein support secure virtual key ceremonies.

Various aspects of the present disclosure provide techniques for managing cryptographic keys in the context of virtual key ceremonies. For example, the techniques described herein may support ensuring sufficient key custodian representation (e.g., via verifying a quorum token), generating and deriving cryptographic keys in a secure fashion, and generating ceremony artifacts or logs that support ceremony security and accountability. An organization may use a root key (e.g., a Rivest-Shamir-Adleman (RSA) private key) to issue client authentication certificates, and the techniques described herein may support accessing and storing the root key in a secure fashion.

The organization may include individuals who are deemed or considered cryptography officers, and the cryptography officers may be split into multiple groups known as pools, which may be used to support sufficient cryptography officer representation in a virtual key ceremony. In some cases, a pool may correspond to a geographic region, an organizational division, a level of education, a seniority level, a demographic characteristic, or the like. Each cryptography officer may be associated with a pool, and cryptographic signatures generated by the cryptography officers may indicate both the cryptography officer as well as the associated pool. A virtual key ceremony may be performed based on the successful verification of a quorum token, and the successful verification of the quorum token may indicate sufficient pool representation, thereby ensure sufficient pool representation in the virtual key ceremony and improving ceremony security.

In some cases, a virtual key ceremony may be performed based on the quorum token representing a threshold number of pools. For example, a cryptography officer may possess or be otherwise associated with a cryptographic key pair (e.g., an asymmetric key pair, such as an elliptic curve key pair or an RSA key pair) that is associated with a pool, and the cryptography officer may use the private key of the cryptographic key pair to generate a cryptographic signature representing both the cryptography officer and the pool. As such, a ceremony administrator may use the public key of the cryptographic key pair to verify representation of cryptography officers and a sufficient number of pools. In some cases, the quorum token may be generated based on the cryptographic signatures, and the ceremony administrator may verify sufficient pool representation in the quorum token.

Based on verifying sufficient pool representation, cryptographic shares may be decrypted and used to derive a wrapping key (e.g., a master wrapping key). In some cases, the master wrapping key may be generated on a virtual key ceremony host, and the master wrapping key may be stored in volatile memory to prevent the persistence of unintentional key artifacts. The wrapping key may be split into cryptographic shares, and the cryptographic shares may be used to re-derive the wrapping key. The wrapping key may be used to encrypt and decrypt a root key (e.g., a private key), and the root key may be used to issue client authentication certificates among other uses.

Aspects of the disclosure are initially described in the context of an environment supporting an on-demand database service. Aspects of the disclosure are then described in the context of cryptographic key accessing techniques, command line tools, secret sharing techniques, and process flows. Aspects of the disclosure are further illustrated by and described with reference to apparatus diagrams, system diagrams, and flowcharts that relate to techniques for virtual cryptographic key ceremonies.

FIG. 1 illustrates an example of a system 100 for cloud computing that supports techniques for virtual cryptographic key ceremonies in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and interne protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 supports a root of trust based cryptographic system. For example, a root key may be stored in the data center 120 or the cloud platform 115, and the root key may be encrypted (e.g., wrapped) with a master wrapping key to control access to the root key. The master wrapping key may be split into a plurality of cryptographic shares according to a secret sharing procedure, and a threshold number of cryptographic shares may be needed to reform the mater wrapping key. For example, the master wrapping key may be split into seven shares, and four or more of the shares may be needed to reform the master wrapping key. In other words, the secret sharing procedure may split the master wrapping key into "N" shares, and at least "M" of the shares may be needed to reform the master wrapping key. Splitting the master wrapping key in this fashion may prevent any single individual or entity from reforming the master key, thereby improving system security.

The data center 120 may include a device for hosting virtual key ceremonies. The device may include components of a server of user device, and the device may, in some cases, host a virtual machine that serves as a host for a virtual key ceremony. The device may receive a plurality of public keys and a plurality of digital signatures comprising data encrypted using a plurality of private keys, where each private key of the plurality of private keys corresponds to a respective public key of the plurality of public keys. The device may generate a quorum token based on the plurality of signatures and the plurality of public keys, where generating the quorum token is based on the plurality of signatures representing at least a threshold number of pools. The device may receive a plurality of encrypted shares associated with respective pools of a plurality of pools, generate a master wrapping key based on generating the quorum token and receiving the plurality of encrypted shares, unwrap a root key using the master wrapping key, and generate a certificate based on the root key.

The cloud platform 115 may use certificates (e.g., client authentication certificates) to authenticate clients. For example, the root key may be used to generate a client authentication certificate to associate an identity (e.g., a client, an individual, an institution, etc.) with a certificate authority, and the client authentication certificate may be used to authenticate cryptographic tools or features, such as public key cryptography tools. The techniques described herein improve system security in the context of virtual key ceremonies for generating or accessing root keys, which may be used to generate client certificates among other cryptographic uses.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
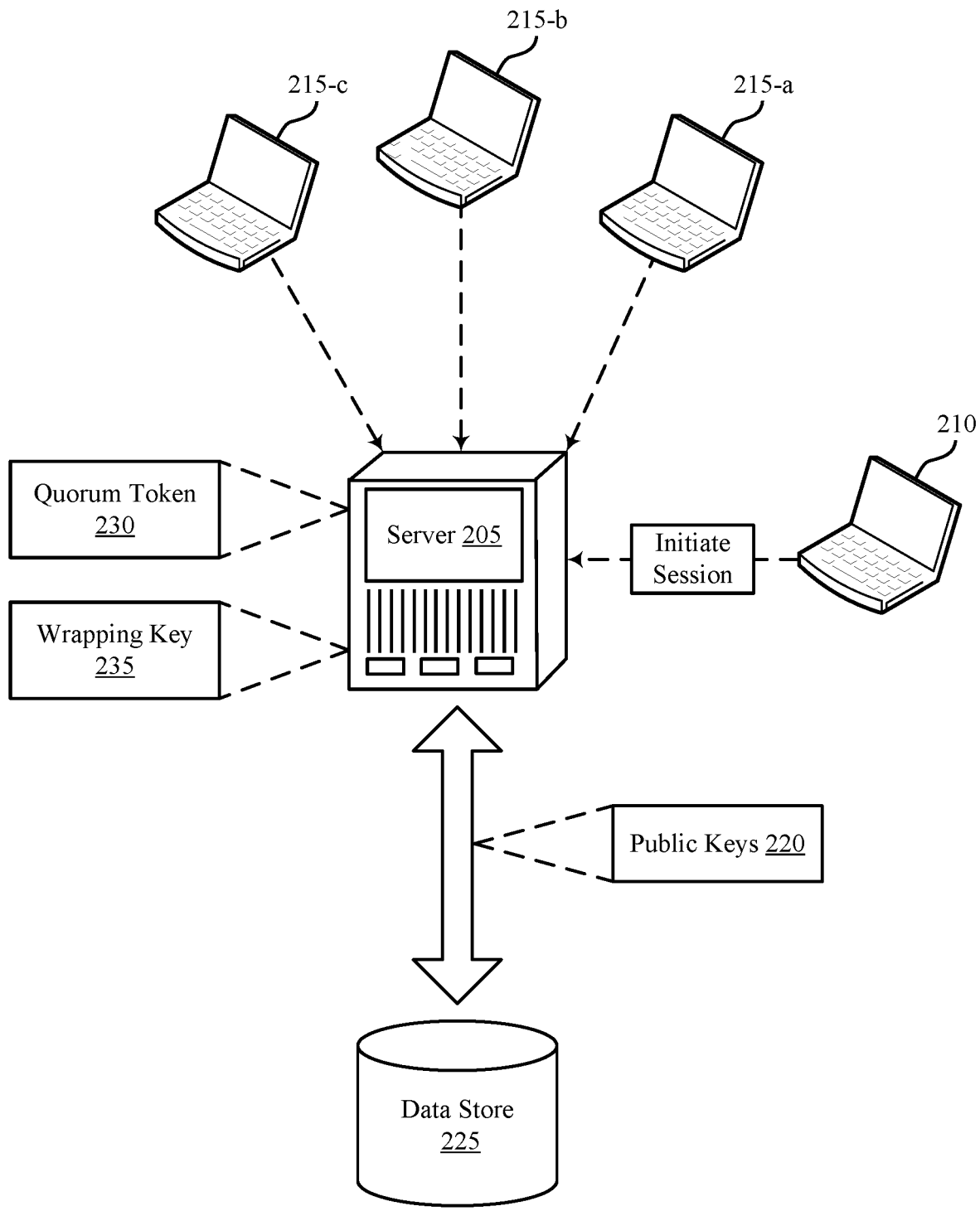
FIG. 2 illustrates an example of a cryptographic key accessing technique that supports techniques for virtual cryptographic key ceremonies in accordance with aspects of the present disclosure.

FIG. 2 illustrates an example of a cryptographic key accessing technique 200 that supports techniques for virtual cryptographic key ceremonies in accordance with aspects of the present disclosure. The cryptographic key accessing technique 200 includes a server 205, a user device 210, a number of user devices 215, and a data store 225. The system 200 may implement aspects of a system 100 as described with reference to FIG. 1. For example, a server 205 may be an example or component of a data center 120 and a user device may be an example of a contact 110 or a cloud client 105.

The user device 210 may be associated with a ceremony administrator, and the ceremony administrator may initiate a session (e.g., a virtual key ceremony). In some cases, the session may be run on the user device 210, while in some other cases the session may be run on hardware separate from the user device 210, such as the server 205. User device 215-a may be associated with a first cryptography officer and a first pool, user device 215-b may be associated with a second cryptography officer and a second pool, and user device 215-c may be associated with a third cryptography officer and a third pool. User devices 215-a, 215-b, and 215-c may each generate a cryptographic signature and transmit the generated cryptographic signature to the server 205 such that the ceremony administrator can access the signatures.

The ceremony administrator, or a program executed by the ceremony administrator (e.g., a command line interface) may perform the quorum token verification 230 to verify that a pool representation condition is satisfied. The pool representation condition may correspond to at least "M" pools of "N" possible pools being represented by the signatures, where "M" and "N" are both integers. The server 205 may retrieve a group of public keys 220 from the data store 225, and the public keys 220 may be used to verify each signature and determine the pool that each signature represents. Using the cryptographic signatures to verify sufficient pool representation may improve system security, as the cryptographic ceremony may be terminated (or unable to start) if an insufficient number of pools are represented, which may prevent unauthorized or unintended access to cryptographic keys.

The user devices 215-a, 215-b, and 215-c may each transmit an encrypted share to the server 205 and perform a decryption of the transmitted share. Each share may be encrypted using the public keys corresponding to the cryptography officers, and once transmitted to the server 205, each encrypted share may be decrypted using the private key corresponding to the respective pool. All of the decrypted shares may be used as input to key reforming procedure (e.g., Shamir's Secret Sharing) to reform or otherwise derive the wrapping key 235. In some cases, the wrapping key 235 may be an example of a symmetric cryptographic key, such as an AES key. The wrapping key 235 may be used to unwrap (e.g., decrypt) a root key, and the root key may be used to issue client authentication certificates.

The wrapping key 235 may be stored in volatile memory to prevent unintended remnants of the wrapping key 235 from being stored on the server 235. To persevere the ability to reform the wrapping key 235, the wrapping key 235 may be split into a number of shares, and the number of shares may correspond to the number of possible pools (e.g., "n"). Each share may correspond to a respective pool, and each share may be encrypted using the public keys corresponding to the respective pool. Each share may also be cryptographically signed using the private key corresponding to the respective pool. After the wrapping key 235 has been split into shares, the ceremony administrator may gather ceremony artifacts (e.g., configuration files, log files, etc.).

Figure 3:
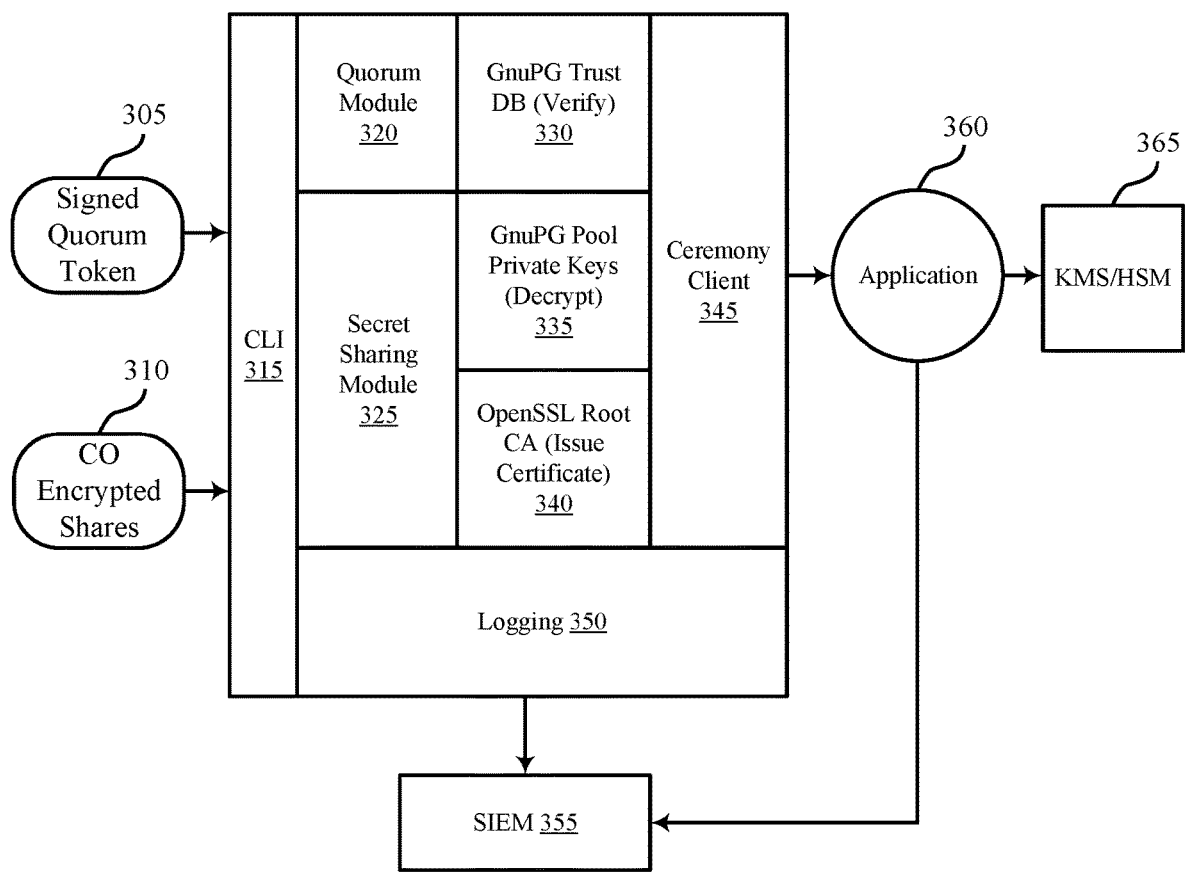
FIG. 3 illustrates an example of a command line interface that supports techniques for virtual cryptographic key ceremonies in accordance with aspects of the present disclosure.

FIG. 3 illustrates an example of a command line interface 300 that supports techniques for virtual cryptographic key ceremonies in accordance with aspects of the present disclosure. The command line interface 300 illustrates an example of a software program that supports techniques for virtual cryptographic key ceremonies, and it should be understood the command line interface 300 may be implemented as a web application, a desktop application, a software package, an embedded system, or the like, and the command line interface 300 may run on various computing hardware such as servers and a user devices.

The signed quorum token 305 and the cryptography officer encrypted shares 310 may be received as inputs to the command line interface 315. The quorum module 320 may provide a schema for ceremony metadata. In some cases, the quorum module 320 may include a predefined schema for ceremony metadata, while in some other cases, the quorum module 320 may support users in defining a schema for ceremony metadata. A schema for ceremony metadata may define ceremony artifacts such as the data that will be captured in log files and the files that will be captured (e.g., video files, audio files, etc.). The quorum module 320 may define methods for forming multiple signatures into quorum tokens, how a trust database (e.g., the GnuPG Trust Database 330) is integrated for signature verification, and a mechanism for how cryptography officers create quorum tokens before virtual key ceremonies.

The secret sharing module 325 may perform a secret sharing procedure (e.g., Shamir's Secret Sharing) on a cryptographic key (e.g., a symmetric cryptographic key such as an AES key). The secret sharing module 325 may generate the cryptographic key, perform Shamir's Secret Sharing on the cryptographic key to split the cryptographic key into multiple shares, wrap (e.g., encrypt) the shares using cryptography officer public keys, and delete plaintext secrets and keys in a secure fashion.

The GnuPG pool private keys 335 may be used to decrypt encrypted shares, and the OpenSSL root certificate authority 340 may be used to issue digital certificates. In some cases, the OpenSSL root certificate authority 340 may be separate or independent from the command line interface 300, while in some other cases, the OpenSSL root certificate authority 340 may be a component of the command line interface 300. The OpenSSL root certificate authority 340 may create a root key (e.g., a certificate authority private key such as a 4096 bit RSA private key) and a digital certificate using the root key. The OpenSSL root certificate authority 340 may define procedures for using the root key to issue client authentication certificates. The OpenSSL root certificate authority 340 may also interact with the secret sharing module 325 to protect the root key.

The logging component 350 may log ceremony artifacts such as ceremony events, ceremony timestamps, video files, audio files, or the like, and the logged ceremony artifacts may be stored in the Security Incident and Event Manager (SIEM) 355. The logging component 350 may be tamper resistant, and the logging component 350 may log ceremony metadata to multiple locations or datastores. The ceremony client 345 may transmit the client authentication certificate to the application 360, and the application 360 may use the client authentication certificate to securely interact with the key management service (KMS)/hardware security module (HSM) 365.

Figure 4:
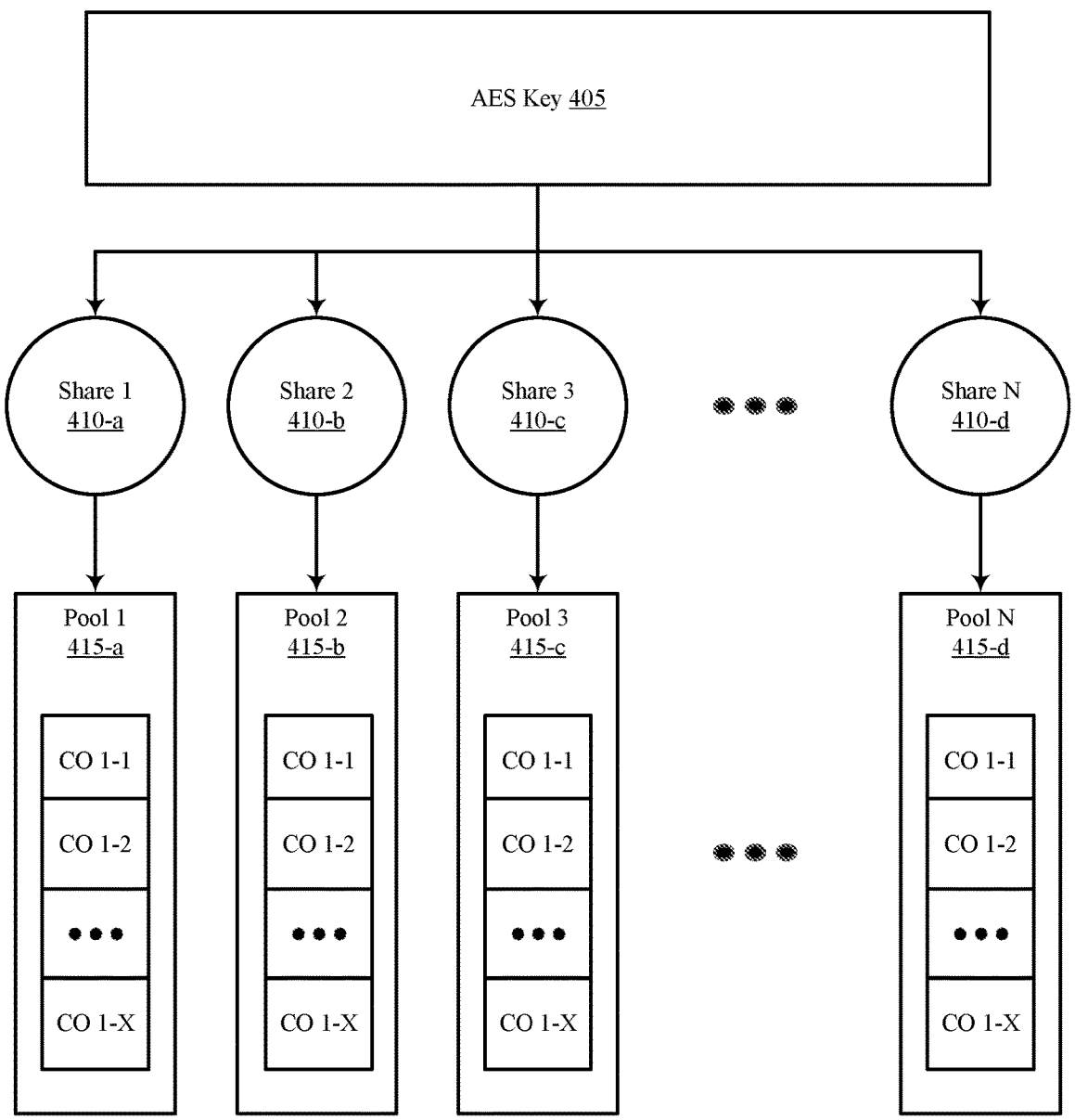
FIG. 4 illustrates an example of a secret sharing technique that supports techniques for virtual cryptographic key ceremonies in accordance with aspects of the present disclosure.

FIG. 4 illustrates an example of a secret sharing technique 400 that supports techniques for virtual cryptographic key ceremonies in accordance with aspects of the present disclosure.

The AES key 405 (e.g., a wrapping key, a 256 bit AES key) may be split up into "N" shares 410. Each share 410 may be associated with a pool 415, and each pool 415 may be associated with a number of cryptography officers (e.g., CO 1-1, CO 1-2). For example, share 1 (e.g., share 410-a) may be associated with pool 1 (e.g., pool 415-a), share 2 (e.g., share 410-b) may be associated with pool 2 (e.g., pool 415-b), share 3 (e.g., share 410-c) may be associated with pool 3 (e.g., pool 415-c), and share "N" (e.g., share 410-d) may be associated with pool "N" (e.g., pool 415-d). The secret sharing technique 400 illustrates an example of Shamir's Secret Sharing, where the secret (e.g., AES key 405) is split into "N" (e.g., 7) shares, and a minimum of "M" (e.g., 4) pools are needed to reform the secret (e.g., AES key 405). This example is provided for illustrative purposes, and other key splitting techniques as well as different numbers of shares and pools may be used.

Each share 410 is assigned to a respective pool 415, and each share 410 may be encrypted using the public keys of the cryptography officers associated with the respective pool 415. Each share 410 may also be digitally cryptographically signed using the private key corresponding to the respective pool 415.

Figure 5:
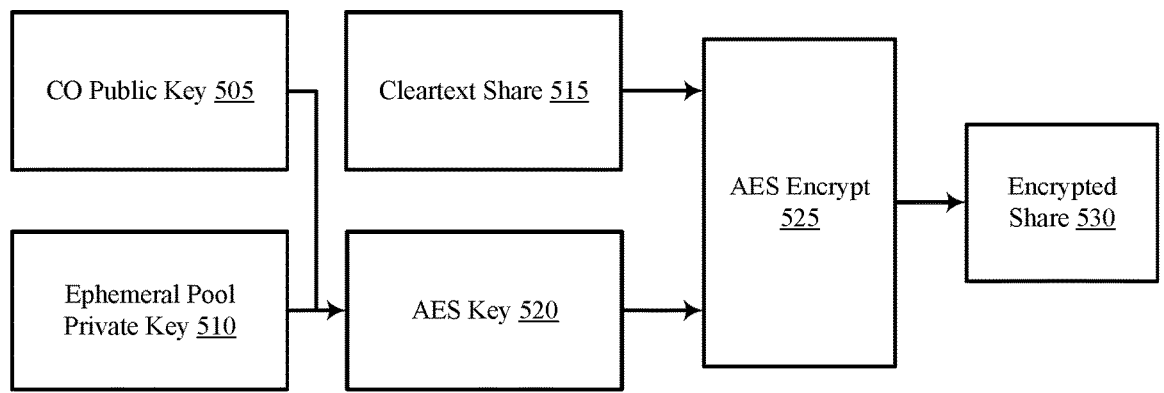
FIG. 5 illustrates an example of a process flow that supports techniques for virtual cryptographic key ceremonies in accordance with aspects of the present disclosure.

FIG. 5 illustrates an example of a share encryption technique 500 that supports techniques for virtual cryptographic key ceremonies in accordance with aspects of the present disclosure.

The cryptography officer public key 505 and the ephemeral pool private key 510 may be used in a key agreement procedure (e.g., an Elliptic Curve Diffie-Hellman key agreement) to create the AES key 520. At 525, the AES key 520 may be used to encrypt the cleartext share 515 (e.g., a plaintext version of the share) to produce the encrypted share 530.

Figure 6:
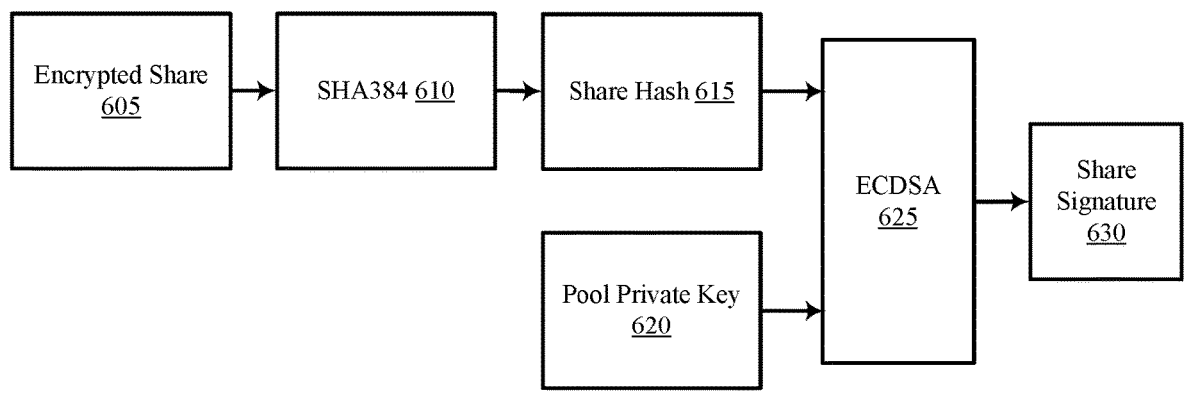
FIG. 6 illustrates an example of a process flow that supports techniques for virtual cryptographic key ceremonies in accordance with aspects of the present disclosure.

FIG. 6 illustrates an example of an encrypted share signing technique 600 that supports techniques for virtual cryptographic key ceremonies in accordance with aspects of the present disclosure.

The encrypted share 605 may be used as input to a hash function 610 (e.g., SHA384) to produce the share hash 615. The Share hash 615 and a pool private key 620 may be used at input for a signing algorithm 625 (e.g., an Elliptic Curve Digital Signature Algorithm (ECDSA)) to produce the share signature 630.

Figure 7:
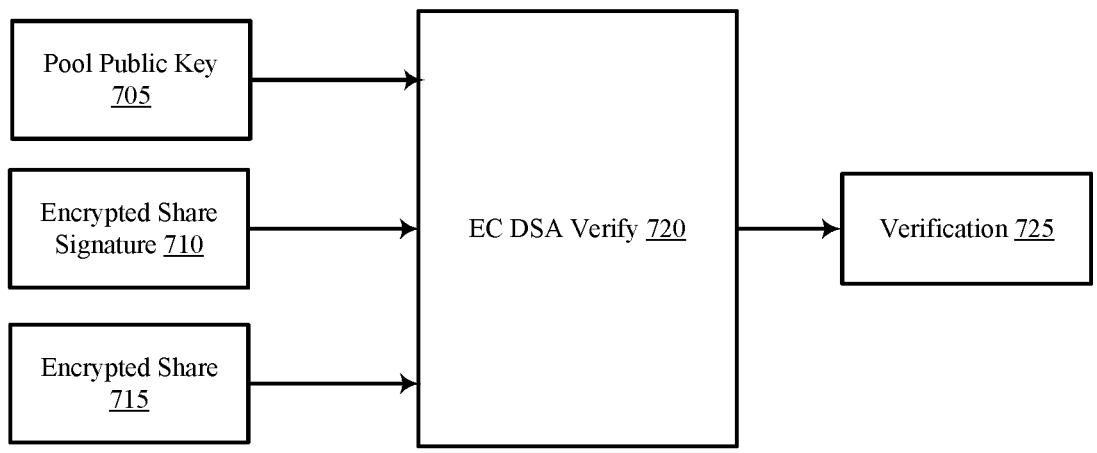
FIG. 7 illustrates an example of a process flow that supports techniques for virtual cryptographic key ceremonies in accordance with aspects of the present disclosure.

FIG. 7 illustrates an example of a signature verification technique 700 that supports techniques for virtual cryptographic key ceremonies in accordance with aspects of the present disclosure.

The signature verification technique 700 may use the pool public key 705, the encrypted share signature 710, and the encrypted share 715 as inputs to the ECDSA verification 720 to determine whether a private key (e.g., the pool private key) associated with the pool public key 705 was used to create the encrypted share signature 710. The verification 725 may indicate whether the pool private key was used to create the encrypted share signature 710.

Figure 8:
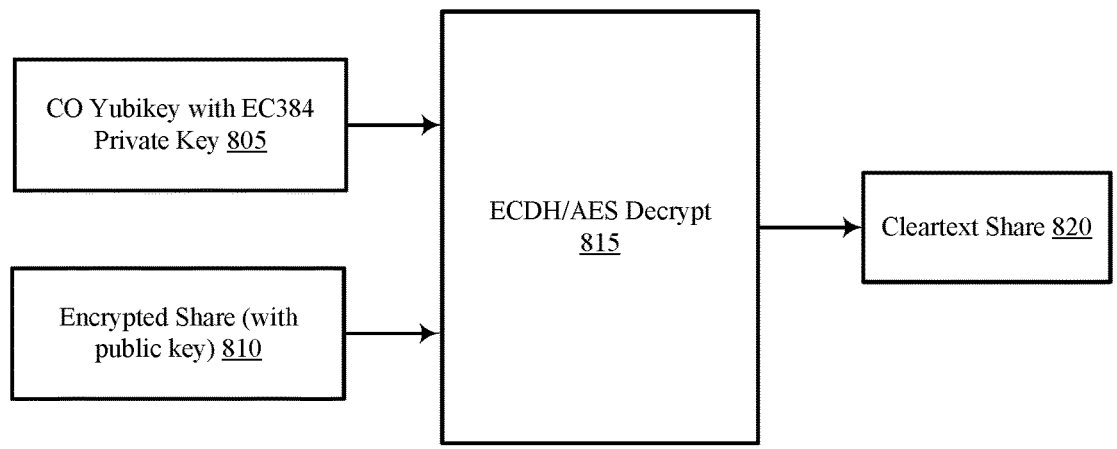
FIG. 8 illustrates an example of a process flow that supports techniques for virtual cryptographic key ceremonies in accordance with aspects of the present disclosure.

FIG. 8 illustrates an example of a share decryption technique 800 that supports techniques for virtual cryptographic key ceremonies in accordance with aspects of the present disclosure.

The share decryption technique 400 illustrates an example technique for decrypting an encrypted share. A private key 805 (e.g., the private key for a cryptography officer stored on a Yubikey or some similar type of secure storage medium) and an encrypted share 810 with a public key (e.g., an ephemeral public key associated with the ephemeral private key 510) may be used as inputs for the ECDH/AES decryption 815. For example, an AES key may be generated based on the private key 805 and the public key, and the AES key may be used to decrypt the encrypted share 810 to generate the cleartext share 820 (e.g., a non-encrypted version of the share).

Figure 9:
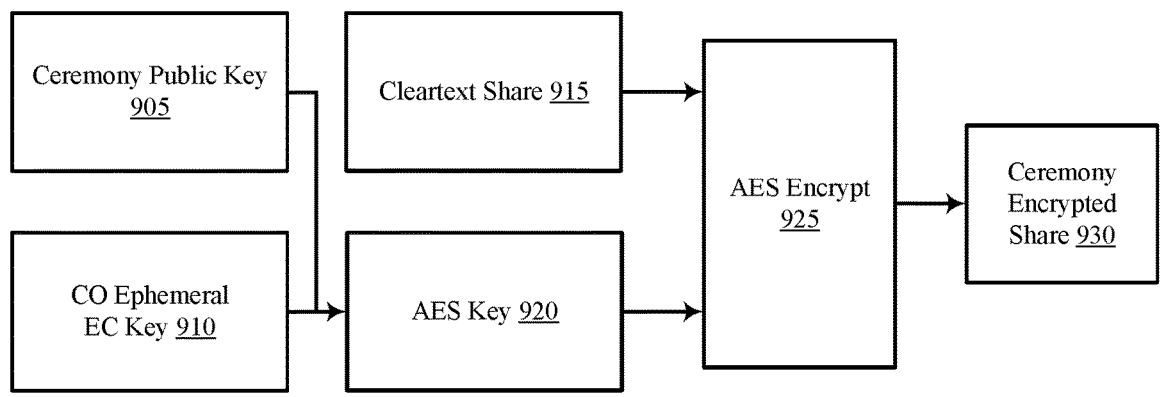
FIG. 9 illustrates an example of a process flow that supports techniques for virtual cryptographic key ceremonies in accordance with aspects of the present disclosure.

FIG. 9 illustrates an example of a transmission technique 900 that supports techniques for virtual cryptographic key ceremonies in accordance with aspects of the present disclosure.

The transmission technique 900 supports securely transmitting shares to a ceremony host. In some cases, the ceremony host, or a ceremony administrator associated with the ceremony host may generate a ceremony key pair that includes a ceremony public key and a ceremony private key. A cryptography officer may use the ceremony public key 905 to encrypt the cleartext share 915 to ensure secure transport to the ceremony host. As such, if the share is intercepted, only persons and/or systems with the ceremony private key (e.g., the ceremony host) will be able to decrypt the share.

The ceremony public key 905 and the cryptography ephemeral elliptic curve key 910 may be used to generate the AES key 920, and the AES key 920 may be used to encrypt the cleartext share 915 at AES encrypt 925 to produce the ceremony encrypted share 930.

Figure 10:
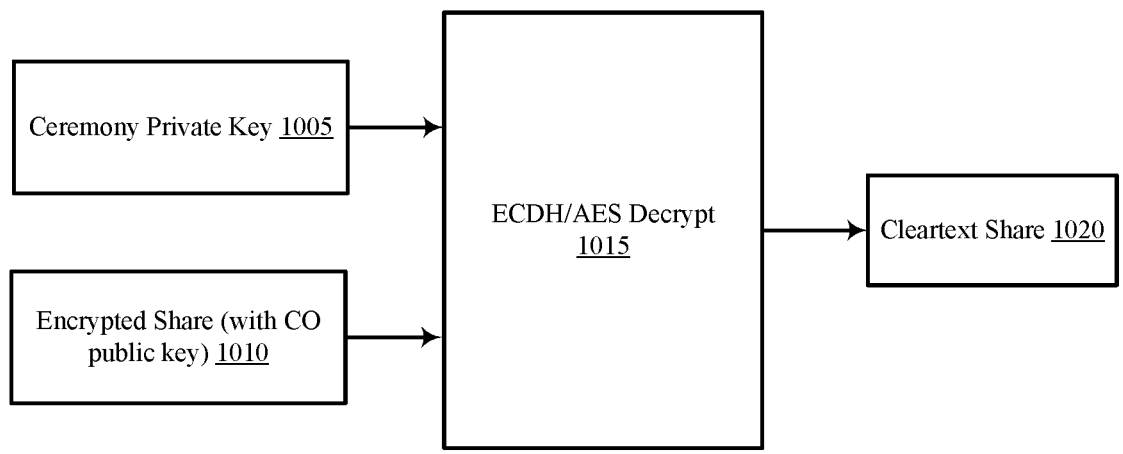
FIG. 10 illustrates an example of a process flow that supports techniques for virtual cryptographic key ceremonies in accordance with aspects of the present disclosure.

FIG. 10 illustrates an example of a decryption technique 1000 that supports techniques for virtual cryptographic key ceremonies in accordance with aspects of the present disclosure.

The decryption technique 1000 supports a ceremony host in decrypting a share that has been encrypted for transmission to the ceremony host. Encrypted shares 1010 received by the ceremony host may be stored in a restricted directory to prevent storing the encrypted shares 1010 in non-volatile storage. The share may be encrypted using a public key of the ceremony host, so the ceremony host may use a private key associated with the public key to decrypt the share. The ECDH/AES decryption 1015 may use the ceremony private key 1005 and the cryptography officer public key to generate an AES key, and the AES key may be used to decrypt the encrypted share 1010 and derive the cleartext share 1020. A cleartext share 1020 may be derived for at least "M" pools, and the at least "M" cleartext shares 1020 may be used to generate the wrapping key.

Figure 11:
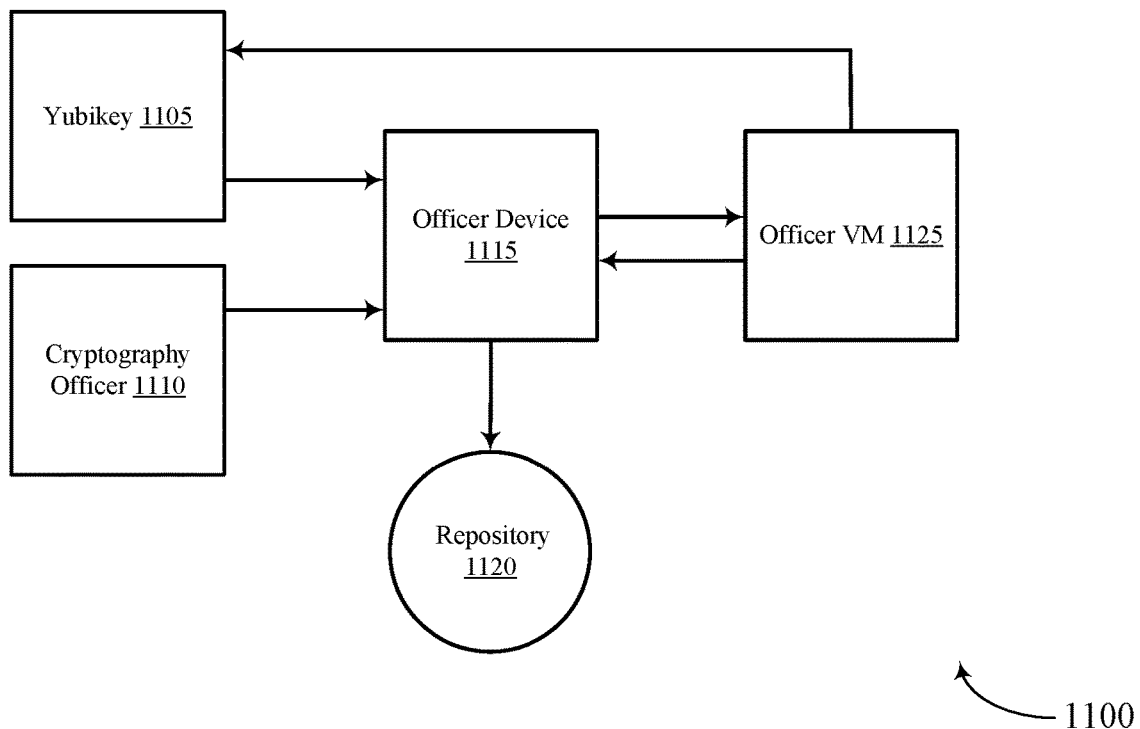
FIG. 11 illustrates an example of a process flow that supports techniques for virtual cryptographic key ceremonies in accordance with aspects of the present disclosure.
Figure 11:
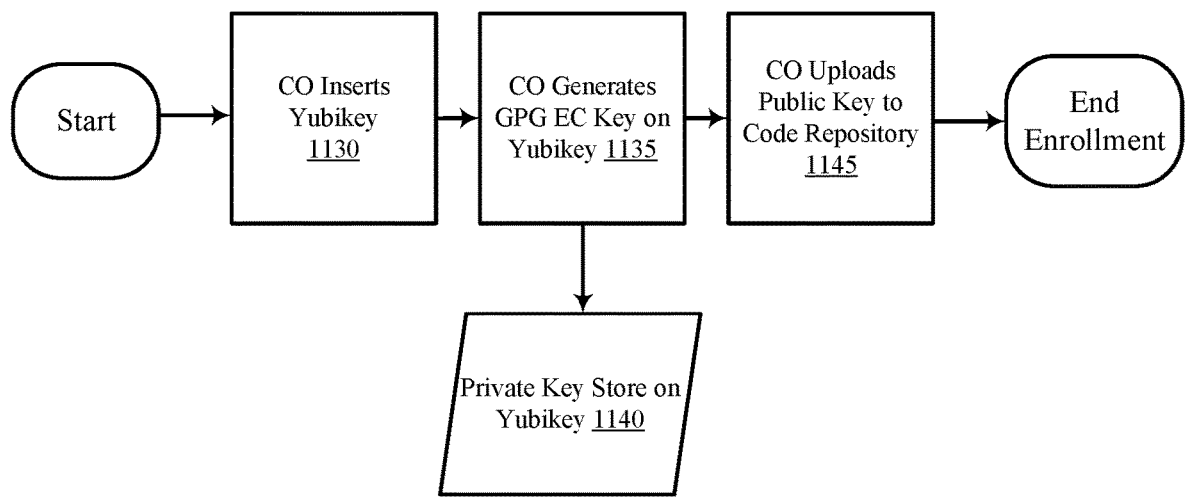

FIG. 11 illustrates an example of a cryptography officer enrollment technique 1100 and a process flow 1101 that support techniques for virtual cryptographic key ceremonies in accordance with aspects of the present disclosure.

The cryptography officer enrollment technique 1100 illustrates an example of a procedure for enrolling a cryptography officer, but it should be understood that other procedures may be used to enroll cryptography officers. The cryptography officer 1110 may launch a virtual machine on the officer device 1115, plug a portable hardware device, such as the Yubikey 1105 into the officer device 1115, and connect the portable hardware device to the virtual machine.

The cryptography officer 1110 may use a software suite (e.g., GNU Privacy Guard (GPG) or a similar software) on the virtual machine to generate an asymmetric key pair (e.g., an elliptic curve key pair). The private key of the key pair may be generated and stored on the portable hardware device, and the public key of the key pair may be stored on the filesystem of the virtual machine. The cryptography officer 1110 may store the public key in a code repository 1120 (e.g., a Git repository or similar code repository).

The process flow 1101 illustrates an example flow for enrolling a cryptography officer. The cryptography officer may insert a Yubikey into a user device at 1130, use GPG to generate a private key on the Yubikey and a public key on the user device at 1135, and store the private key on the Yubikey at 1140. The cryptography officer may upload the public key to a code repository at 1145, and the public key may be used to verify digital signatures generated with the private key.

Figure 12:
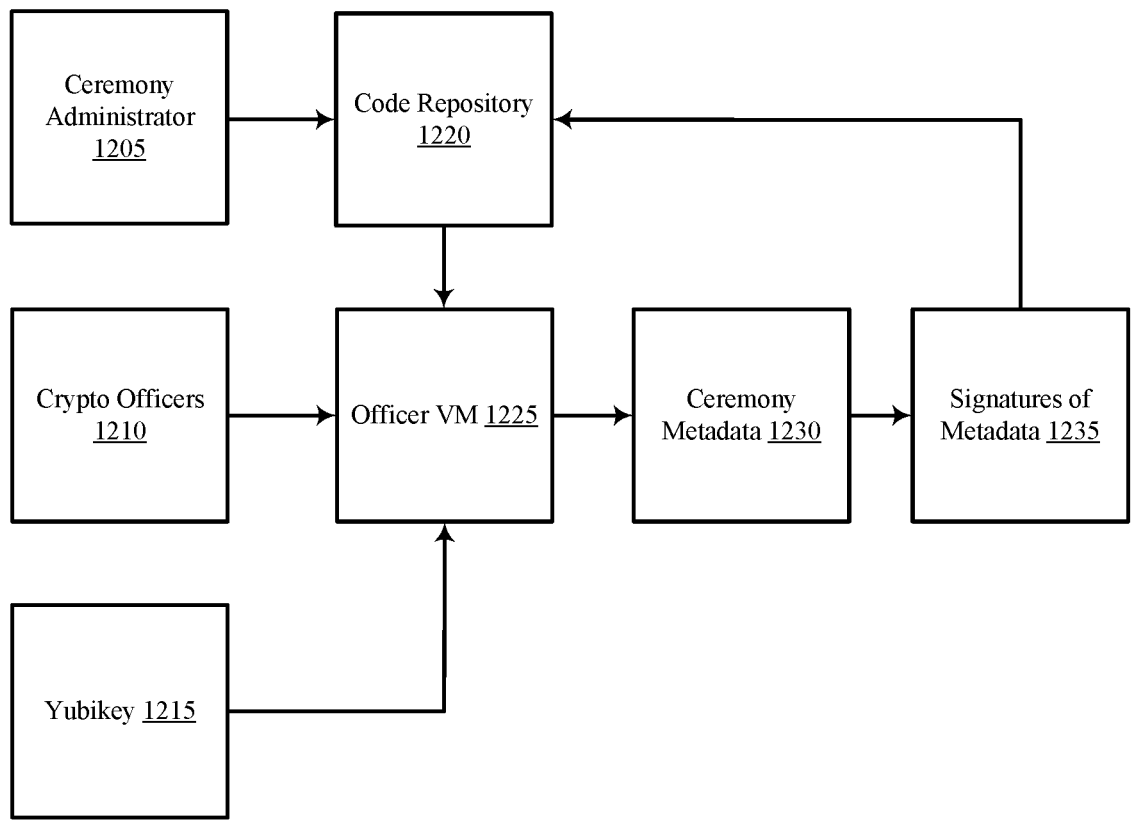
FIG. 12 illustrates an example of a process flow that supports techniques for virtual cryptographic key ceremonies in accordance with aspects of the present disclosure.

FIG. 12 illustrates an example of a quorum token creation technique 1200 that supports techniques for virtual cryptographic key ceremonies in accordance with aspects of the present disclosure.

The ceremony administrator 1205 may create the ceremony metadata 1230. In some cases, the ceremony administrator 1205 may store the ceremony metadata 1230 in the code repository 1220 and create a pull request for the code repository. The cryptographic officers 1210 may clone the ceremony metadata from the code repository and generate a signature of the ceremony metadata on the virtual machine 1225 using a private key stored on the Yubikey 1215 (or some other similar secure storage medium). Each cryptography officer 1210 may perform a pull request to the code repository 1220 to upload their signature of the ceremony metadata, and the signatures of the metadata 1235 may include a signature for each of the cryptography officers 1210. The ceremony metadata 1230 and the signatures of the metadata 1235 may be used to form the quorum token, and the quorum token may be used to authorize a virtual key ceremony. In some cases, the virtual key ceremony may be authorized based on the quorum token including at least "M" signatures.

Figure 13:
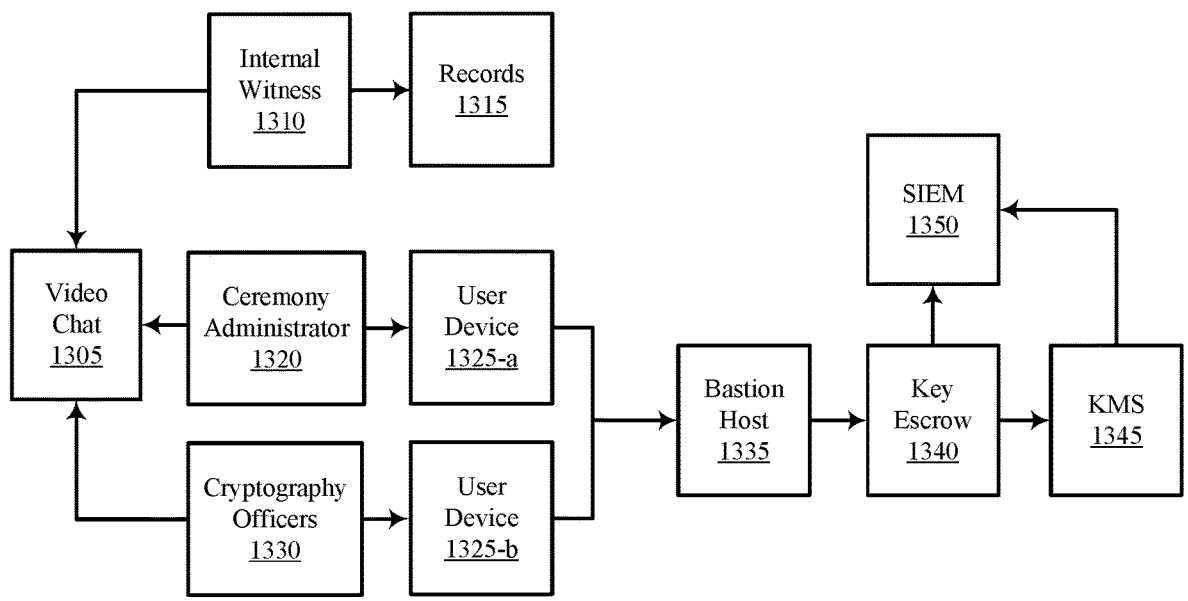
FIG. 13 illustrates an example of a process flow that supports techniques for virtual cryptographic key ceremonies in accordance with aspects of the present disclosure.

FIG. 13 illustrates an example of a process flow 1300 that supports techniques for virtual cryptographic key ceremonies in accordance with aspects of the present disclosure.

At 1305, the ceremony administrator 1320 may launch a web meeting (e.g., a virtual web meeting with audio and video), and the internal witness 1310 as well as the cryptography officers 1330 may join the web meeting. The internal witness 1310 may create meeting records 1315 that indicate who was present at the meeting (e.g., who joined the web meeting), when the meeting took place, when the meeting ended, etc. The ceremony administrator 1320 may use the user device 1325-a to login to a remote terminal and then the bastion host 1335. The cryptography officers 1330 may use the user device 1325-b to login to the remote terminal and then the bastion host 1335. The ceremony administrator 1320 and the cryptography officers 1330 may connect (e.g., create a secure shell (SSH) session) to the key escrow 1340 (e.g., a key ceremony host), where the virtual key ceremony may be performed. The SIEM 1350 may store event logs of the virtual key ceremony, and the KMS 1345 may perform one or more operations based on a key that is generated or otherwise derived during the virtual key ceremony.

Figure 14:
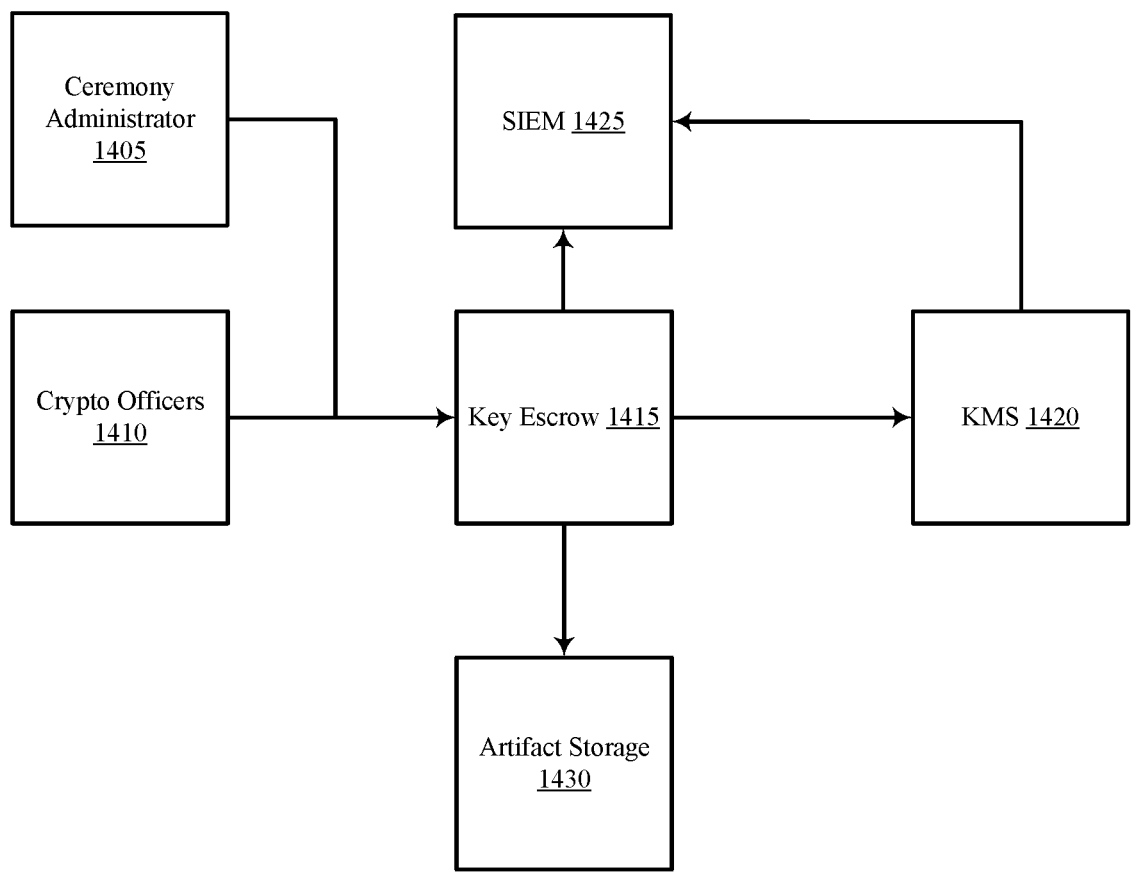
FIG. 14 illustrates an example a process flow that supports techniques for virtual cryptographic key ceremonies in accordance with aspects of the present disclosure.

FIG. 14 illustrates an example of a process flow 1400 that supports techniques for virtual cryptographic key ceremonies in accordance with aspects of the present disclosure.

The ceremony administrator 1405 may provide a signed quorum token to the key escrow 1415. The quorum token may be verified (e.g., confirmed that the quorum token represents at least "M" pools), and a virtual key ceremony may proceed based on verifying the quorum token. Each cryptography officer of the cryptography officers 1410 may provide an encrypted share to the key escrow 1415, and each cryptography officer of the cryptography officers 1410 may perform a decryption of their respective share on the ceremony host. In some cases, each share may be decrypted using a private key corresponding to a respective private key.

Each decrypted share may be used as an input for Shamir's Secret Sharing combination operation to reform the wrapping key. The wrapping key may be used to unwrap (e.g., decrypt) the root key (e.g., a certificate authority private key). The root key may be used to issue client authentication certificates, and the client authentication certificates may be used to establish a session with the KMS 1420. The SIEM 1425 may log ceremony events, and the artifact storage 1430 may store artifacts from the virtual key ceremony.

Figure 15:
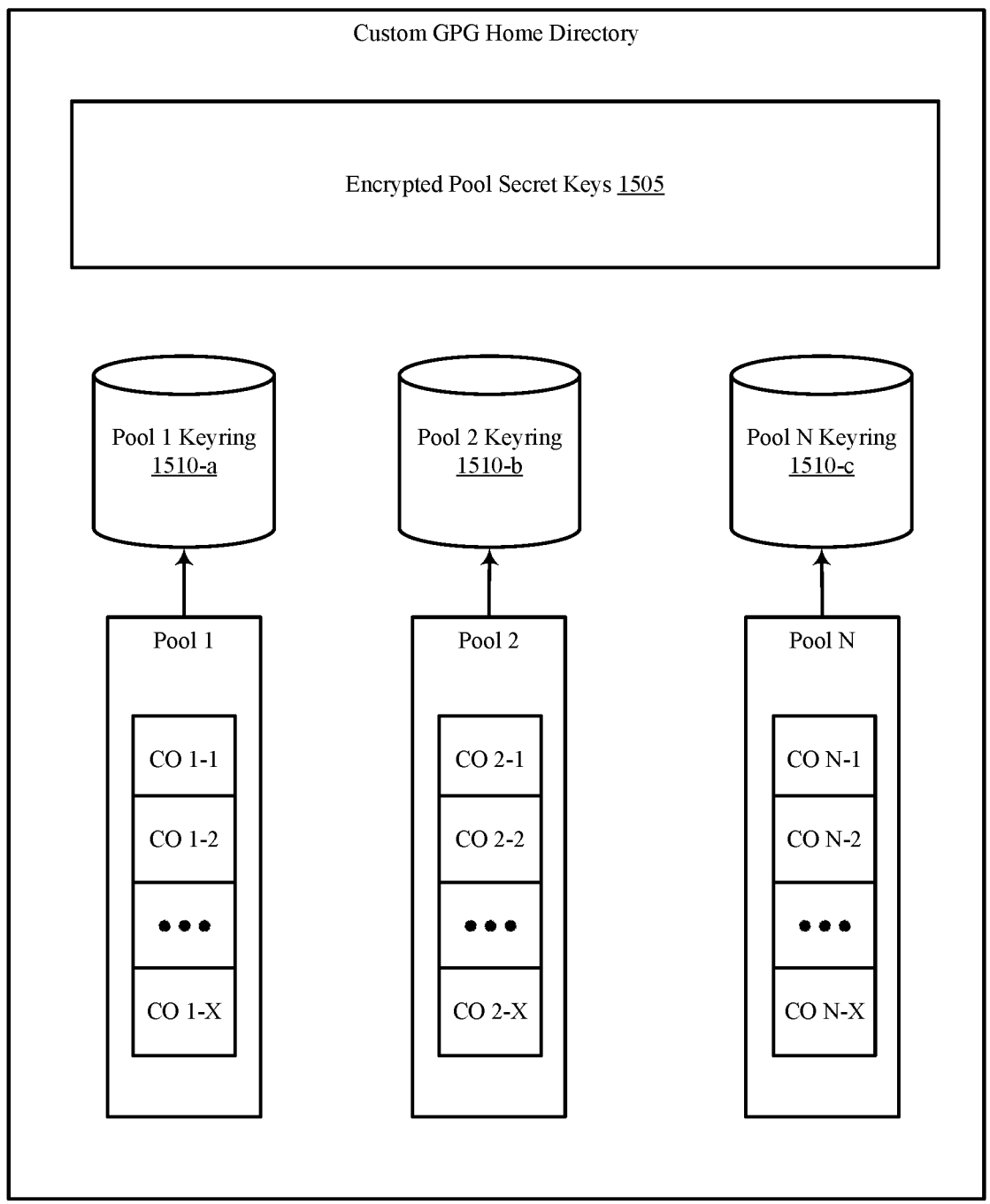
FIG. 15 illustrates an example of a cryptography directory system that supports techniques for virtual cryptographic key ceremonies in accordance with aspects of the present disclosure.

FIG. 15 illustrates an example of a key management technique 1500 that supports techniques for virtual cryptographic key ceremonies in accordance with aspects of the present disclosure.

The pool keyrings 1510 may be used to store cryptographic keys, and the cryptographic keys may be used for securely storing and/or transmitting the encrypted pool secrets 1505. In some cases, the key management technique 1500 may be implemented in a custom GPG home directory. For example, a custom GPG home directory may be statically compiled, and the custom GPG home directory may be used for performing cryptographic operations such as generating keys, encrypting data, decrypting data, transmitting data, etc. In some cases, references to outside code may be removed or verified, which may improve system security. Since the custom GPG home directory may be statically compiled, references to external code repositories may be removed to reduce the risk of security vulnerabilities, since potential vulnerabilities introduced in the external code repositories may not be automaticity downloaded, thereby improving system security and stability.

In some cases, a virtual key may utilize a temporary keyring 1510, and the temporary keyring 1510 may be used to securely transport shares and to sign ceremony artifacts (e.g., logs, configuration files, etc.). Utilizing the temporary keyring 1510 for transport shares may maintain share integrity in the case of message interception, as the temporary keyring 1510 reducing the risk of the intercepting party deriving the key used to encrypt the share. The temporary keyring 1510 may also improve virtual key ceremony integrity, and digital signatures may indicate which user (e.g., a cryptography officer, a key custodian) performed which actions during a key ceremony.

Figure 16:
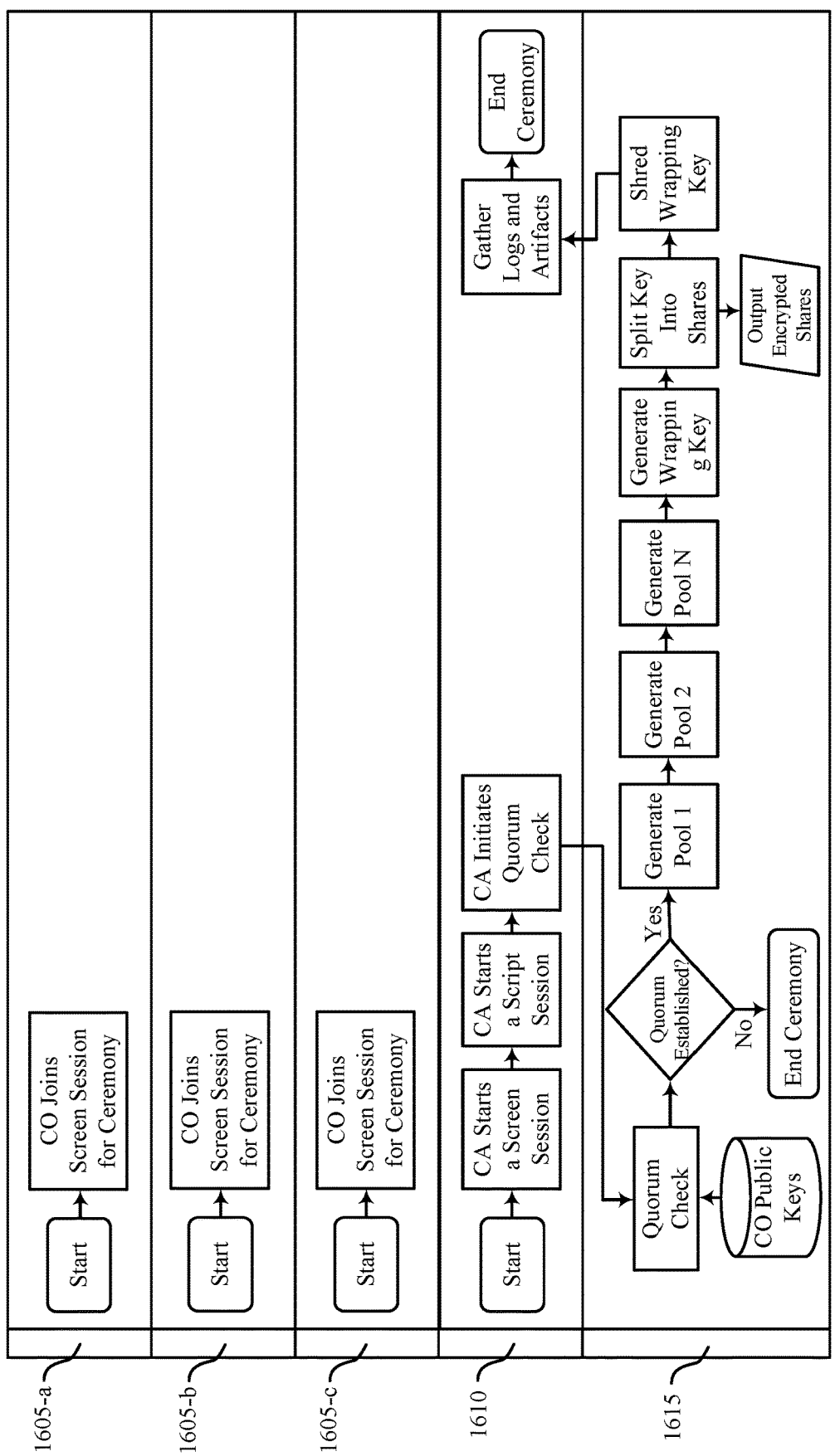
FIG. 16 illustrates an example of a process flow that supports techniques for virtual cryptographic key ceremonies in accordance with aspects of the present disclosure.

FIG. 16 illustrates an example of a process flow 1600 that supports techniques for virtual cryptographic key ceremonies in accordance with aspects of the present disclosure. The steps and components described with respect to FIG. 16 may be examples of the various steps and sub-processes described with reference to FIGS. 1-15.

At 1605-*a*, 1605-*b*, and 1605-*c*, one or more cryptography officers may join a terminal multiplexing session for a virtual cryptographic key ceremony. At 1610, a cryptographic administrator may start a terminal multiplexing session and initiate a quorum check. The quorum check may ensure that a quorum of cryptographic officers from a threshold number of pools has been reached.

At 1615, as described with reference to the previous figures, the quorum check may involve retrieving cryptographic officer public keys and determining whether a quorum is established. If a quorum has been established based on the check, then the system may proceed to generate a plurality of pools. If a quorum has not been established based on the check, then the ceremony may be terminated.

After generation of the pools, a wrapping key may be generated and then split into shares. The shares may be encrypted and stored, and the wrapping key may be shredded. The system may gather logs and artifacts related to the ceremony and the ceremony may then end.

Figure 17:
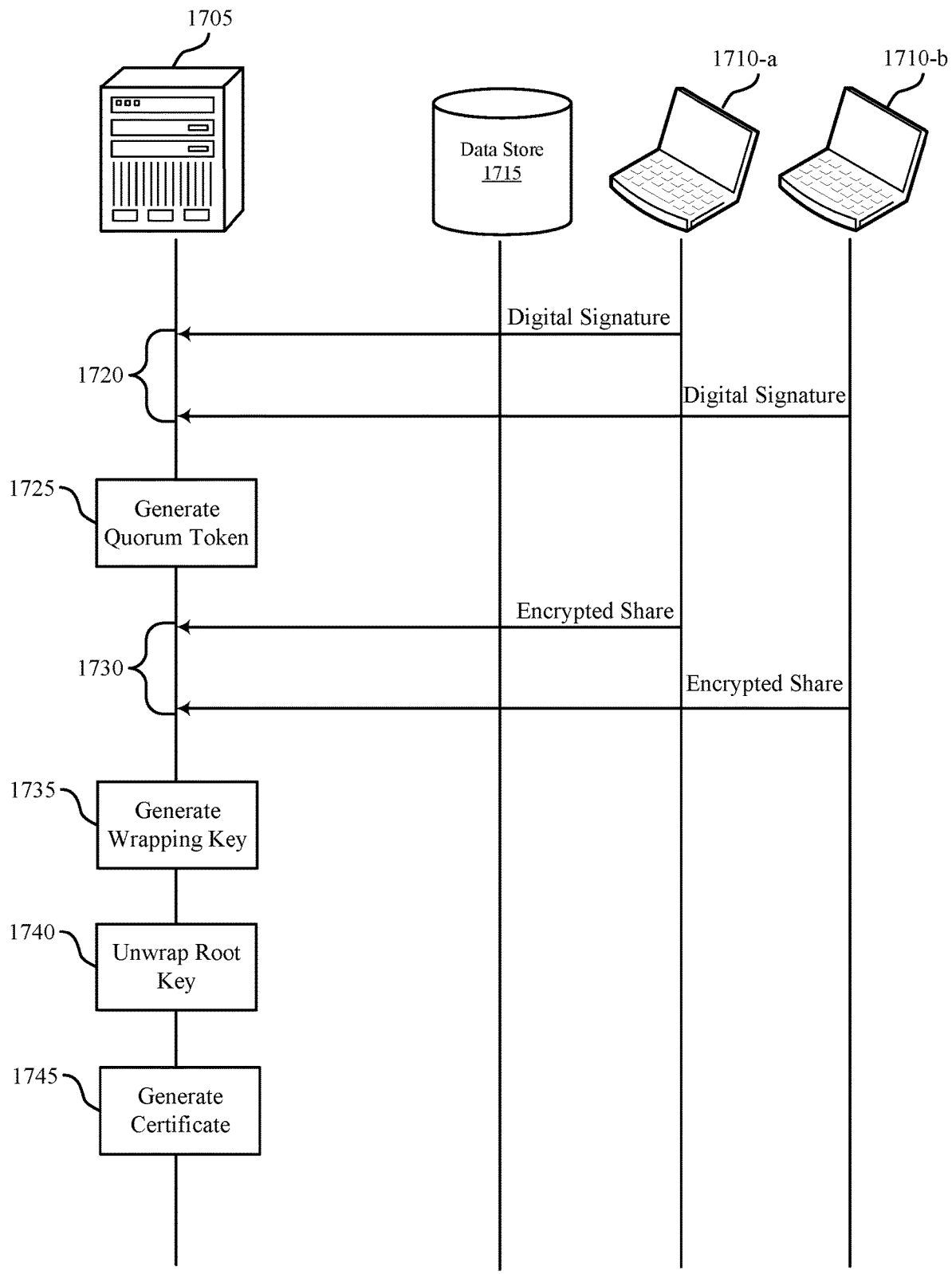
FIG. 17 illustrates an example of a process flow that supports techniques for virtual cryptographic key ceremonies in accordance with aspects of the present disclosure.

FIG. 17 illustrates an example of a process flow 1700 that supports techniques for virtual cryptographic key ceremonies in accordance with aspects of the present disclosure. The process flow 1700 may be implemented by a server 1705, a data store 1715, and user devices 1710. The server 1705 may be examples of user devices 215 described with respect to FIG. 2. The data store 1715 may be an example of data store 225 described with respect to FIG. 2. The process flow 1700 may implement aspects of performing a virtual cryptographic key ceremony as described with reference to FIGS. 1-16.

In the following description of the process flow 1700, the operations between the components and systems may be performed in different orders or at different times. Certain operations may also be left out of the process flow 1700, or other operations may be added.

At 1720, the server 1705 may receive a plurality of public keys and a plurality of signatures. The public keys and/or the signatures may be received from user devices 1710 operated by one or more cryptographic officers. The plurality of signatures may include data encrypted using a plurality of private keys, and each private key of the plurality of private keys may correspond to a respective public key of the plurality of public keys. In some examples, a private key of the plurality of private keys and a corresponding respective public key of the plurality of public keys are stored on a portable hardware device, and the portable hardware device is configured to refrain from transmitting the private key off the portable hardware device. In some examples, each private key of the plurality of private keys and each corresponding respective public key of the plurality of public keys comprises an elliptic curve key pair.

At 1725, the server 1705 may generate a quorum token based on the plurality of signatures and the plurality of public keys. In some examples, generating the quorum token is based on the plurality of signatures representing at least a threshold number of pools. In some examples, generating a quorum token includes a command line interface program verifying that the plurality of signatures represents at least the threshold number of pools. In some examples, the process flow 1700 may also include generating a log file based on generating the quorum token and receiving the plurality of encrypted shares, wherein the log file includes a video recording or some other record and signing the log file with each private key of the plurality of private keys. In some examples, generating the quorum token is further based on the plurality of signatures representing at least a threshold number of pools of a total number of pools.

At 1730, the server 1705 may receive a plurality of encrypted shares. Each encrypted share of the plurality of encrypted shares may be associated with a respective pool of the plurality of pools. In some examples, the server 1705 may decrypt each encrypted share of the plurality of encrypted shares based on a user input corresponding to a password and a respective private key corresponding to a respective pool of the plurality of pools. In some examples, generating the master wrapping key, as described in step 1735, is based on decrypting each encrypted share of the plurality of encrypted shares.

At 1735, the server 1705 may generate a master wrapping key based on generating the quorum token and receiving the plurality of encrypted shares. In some examples, the master wrapping key may be stored in volatile memory such that a system reboot results in destruction of the master wrapping key. In some examples, the server 1705 may split the master wrapping key into a plurality of shares, where each share of the plurality of shares is associated with a respective pool of the plurality of pools. The server 1705 may also encrypt a share of the plurality of shares based on a plurality of respective public keys associated with a respective pool of the plurality of pools. In some examples, encrypting each share of the plurality of shares includes generating a symmetric cryptographic key based on the plurality of respective public keys associated with the respective pool of the plurality of pools and encrypting the share of the plurality of shares using the symmetric cryptographic key. In some examples, the server 1705 may generate a signature for each share of the plurality of shares using a respective private key corresponding to a pool of the plurality of pools. In some examples, splitting the master wrapping key includes using a Shamir's secret sharing scheme. In some examples, generating the master wrapping key includes generating the master wrapping key on a virtual machine. In some examples, the process flow 1700 includes terminating the virtual machine, where terminating the virtual machine flushes volatile memory associated with the virtual machine.

At 1740, the server 1705 may unwrap a root key using the master wrapping key. In some examples, the root key corresponds to a private key of a Rivest Shamir Adleman (RSA) key pair comprising the private key and a corresponding public key.

At 1745, the server 1705 may generate a certificate based on the root key. The certificate may include a client authentication certificate.

Figure 18:
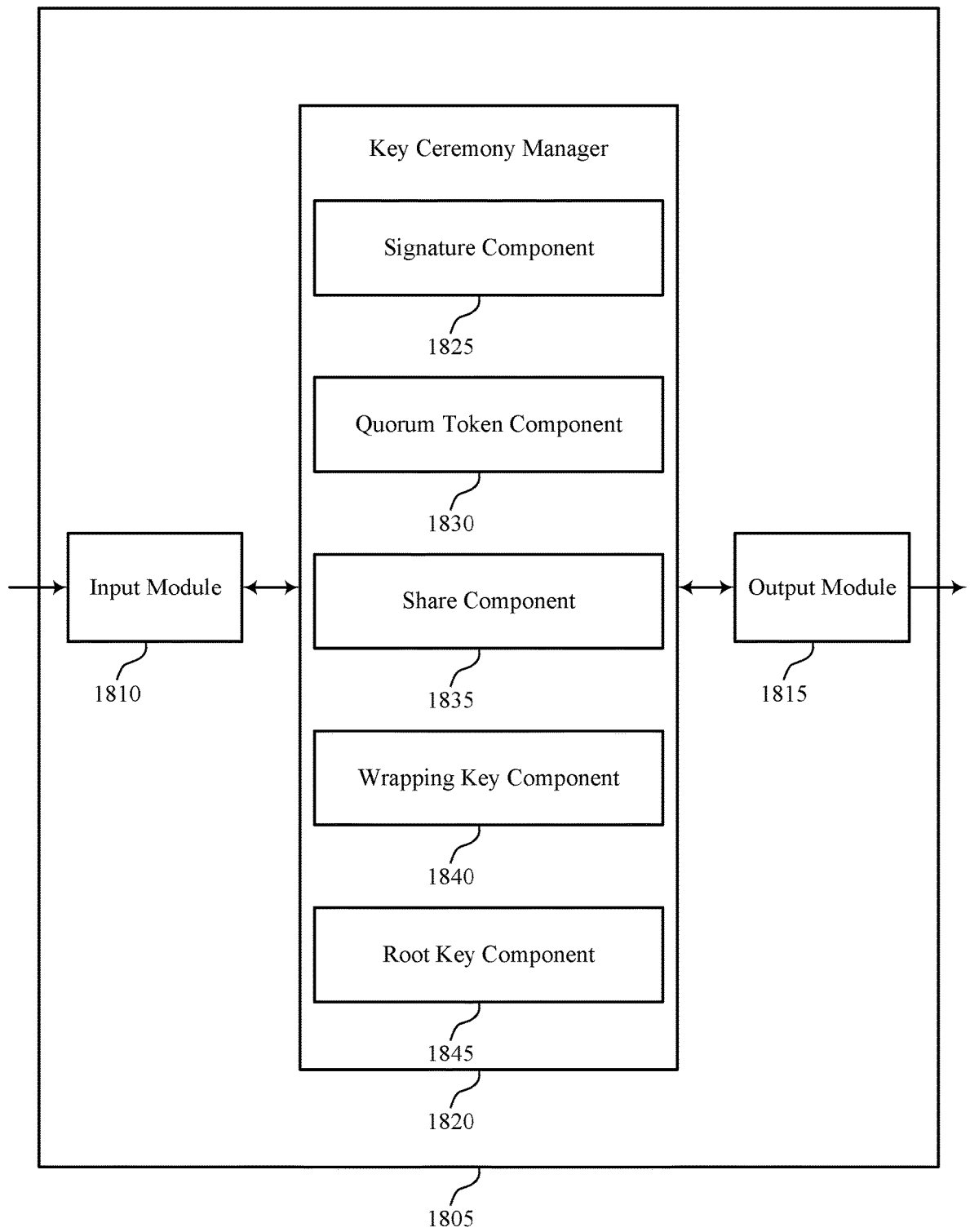
FIG. 18 shows a block diagram of an apparatus that supports techniques for virtual cryptographic key ceremonies in accordance with aspects of the present disclosure.

FIG. 18 shows a block diagram 1800 of a device 1805 that supports techniques for virtual cryptographic key ceremonies in accordance with aspects of the present disclosure. The device 1805 may include an input module 1810, an output module 1815, and a key ceremony manager 1820. The device 1805 may also include a processor. Each of these components may be in communication with one another (e.g., via one or more buses).

The input module 1810 may manage input signals for the apparatus 1805. For example, the input module 1810 may identify input signals based on an interaction with a modem, a keyboard, a mouse, a touchscreen, or a similar device. These input signals may be associated with user input or processing at other components or devices. In some cases, the input module 1810 may utilize an operating system such as iOS®, ANDROID®, MS-DOS®, MS-WINDOWS®, OS/2®, UNIX®, LINUX®, or another known operating system to handle input signals. The input module 1810 may send aspects of these input signals to other components of the apparatus 1805 for processing. For example, the input module 1810 may transmit input signals to the key ceremony manager 2020 to support techniques for virtual cryptographic key ceremonies. In some cases, the input module 1810 may be a component of an I/O controller 2010 as described with reference to FIG. 20.

The output module 1815 may manage output signals for the apparatus 1805. For example, the output module 1815 may receive signals from other components of the apparatus 1805, such as the Key Ceremony Manager 1820, and may transmit these signals to other components or devices. In some specific examples, the output module 1815 may transmit output signals for display in a user interface, for storage in a database or data store, for further processing at a server or server cluster, or for any other processes at any number of devices or systems. In some cases, the output module 1815 may be a component of an I/O controller 2010 as described with reference to FIG. 20.

For example, the key ceremony manager 1820 may include a signature component 1825, a quorum token component 1830, a share component 1835, a wrapping key component 1840, a root key component 1845, or any combination thereof. In some examples, the key ceremony manager 1820, or various components thereof, may be configured to perform various operations (e.g., receiving, monitoring, transmitting) using or otherwise in cooperation with the input module 1810, the output module 1815, or both. For example, the key ceremony manager 1820 may receive information from the input module 1810, send information to the output module 1815, or be integrated in combination with the input module 1810, the output module 1815, or both to receive information, transmit information, or perform various other operations as described herein.

The key ceremony manager 1820 may support encryption key management in accordance with examples as disclosed herein. The signature component 1825 may be configured as or otherwise support a means for receiving a plurality of public keys and a plurality of signatures, wherein the plurality of signatures comprise data encrypted using a plurality of private keys, and wherein each private key of the plurality of private keys corresponds to a respective public key of the plurality of public keys. The quorum token component 1830 may be configured as or otherwise support a means for generating a quorum token based at least in part on the plurality of signatures and the plurality of public keys, wherein generating the quorum token is based at least in part on the plurality of signatures representing at least a threshold number of pools. The share component 1835 may be configured as or otherwise support a means for receiving a plurality of encrypted shares, wherein each encrypted share of the plurality of encrypted shares is associated with a respective pool of the plurality of pools. The wrapping key component 1840 may be configured as or otherwise support a means for generating a master wrapping key based at least in part on generating the quorum token and receiving the plurality of encrypted shares. The root key component 1845 may be configured as or otherwise support a means for unwrapping a root key using the master wrapping key. The root key component 1845 may be configured as or otherwise support a means for generating a certificate based at least in part on the root key.

Figure 19:
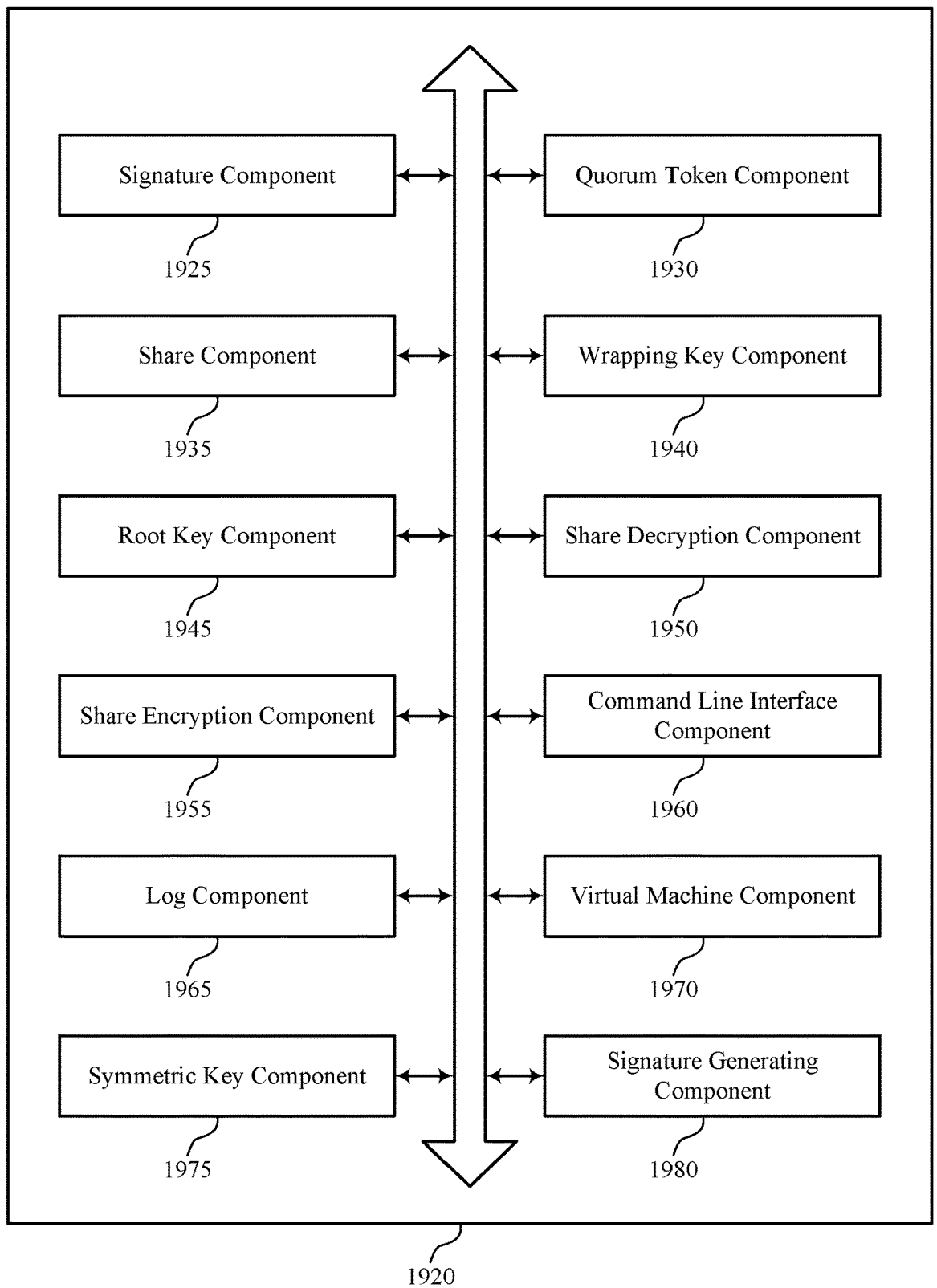
FIG. 19 shows a block diagram of a key ceremony manager that supports techniques for virtual cryptographic key ceremonies in accordance with aspects of the present disclosure.

FIG. 19 shows a block diagram 1900 of a key ceremony manager 1920 that supports techniques for virtual cryptographic key ceremonies in accordance with aspects of the present disclosure. The key ceremony manager 1920 may be an example of aspects of a key ceremony manager or a key ceremony manager 1820, or both, as described herein. The key ceremony manager 1920, or various components thereof, may be an example of means for performing various aspects of techniques for virtual cryptographic key ceremonies as described herein. For example, the key ceremony manager 1920 may include a signature component 1925, a quorum token component 1930, a share component 1935, a wrapping key component 1940, a root key component 1945, a share decryption component 1950, a share encryption component 1955, a command line interface component 1960, a log component 1965, a virtual machine component 1970, a symmetric key component 1975, a signature generating component 1980, or any combination thereof. Each of these components may communicate, directly or indirectly, with one another (e.g., via one or more buses).

The key ceremony manager 1920 may support encryption key management in accordance with examples as disclosed herein. The signature component 1925 may be configured as or otherwise support a means for receiving a plurality of public keys and a plurality of signatures, wherein the plurality of signatures comprise data encrypted using a plurality of private keys, and wherein each private key of the plurality of private keys corresponds to a respective public key of the plurality of public keys. The quorum token component 1930 may be configured as or otherwise support a means for generating a quorum token based at least in part on the plurality of signatures and the plurality of public keys, wherein generating the quorum token is based at least in part on the plurality of signatures representing at least a threshold number of pools. The share component 1935 may be configured as or otherwise support a means for receiving a plurality of encrypted shares, wherein each encrypted share of the plurality of encrypted shares is associated with a respective pool of the plurality of pools. The wrapping key component 1940 may be configured as or otherwise support a means for generating a master wrapping key based at least in part on generating the quorum token and receiving the plurality of encrypted shares. The root key component 1945 may be configured as or otherwise support a means for unwrapping a root key using the master wrapping key. In some examples, the root key component 1945 may be configured as or otherwise support a means for generating a certificate based at least in part on the root key.

In some examples, the share decryption component 1950 may be configured as or otherwise support a means for decrypting each encrypted share of the plurality of encrypted shares based at least in part on a user input corresponding to a password and a respective private key corresponding to a respective pool of the plurality of pools, wherein generating the master wrapping key is based at least in part on decrypting each encrypted share of the plurality of encrypted shares.

In some examples, the wrapping key component 1940 may be configured as or otherwise support a means for storing the master wrapping key in volatile memory such that a system reboot results in destruction of the master wrapping key.

In some examples, the wrapping key component 1940 may be configured as or otherwise support a means for splitting the master wrapping key into a plurality of shares, wherein each share of the plurality of shares is associated with a respective pool of the plurality of pools. In some examples, the share encryption component 1955 may be configured as or otherwise support a means for encrypting a share of the plurality of shares based at least in part on a plurality of respective public keys associated with a respective pool of the plurality of pools.

In some examples, to support encrypting each share of the plurality of shares, the symmetric key component 1975 may be configured as or otherwise support a means for generating a symmetric cryptographic key based at least in part on the plurality of respective public keys associated with the respective pool of the plurality of pools. In some examples, to support encrypting each share of the plurality of shares, the symmetric key component 1975 may be configured as or otherwise support a means for encrypting the share of the plurality of shares using the symmetric cryptographic key.

In some examples, the signature generating component 1980 may be configured as or otherwise support a means for generating a signature for each share of the plurality of shares using a respective private key corresponding to a pool of the plurality of pools.

In some examples, splitting the master wrapping key comprises a Shamir's secret sharing scheme.

In some examples, to support generating the quorum token, the command line interface component 1960 may be configured as or otherwise support a means for a command line interface program verifying that the plurality of signatures represent at least the threshold number of pools.

In some examples, the log component 1965 may be configured as or otherwise support a means for generating a log file based at least in part on generating the quorum token and receiving the plurality of encrypted shares, wherein the log file includes a video recording. In some examples, the log component 1965 may be configured as or otherwise support a means for signing the log file with each private key of the plurality of private keys.

In some examples, the virtual machine component 1970 may be configured as or otherwise support a means for running a virtual machine, wherein generating the master wrapping key comprises generating the master wrapping key on the virtual machine.

In some examples, the virtual machine component 1970 may be configured as or otherwise support a means for terminating the virtual machine, wherein terminating the virtual machine flushes volatile memory associated with the virtual machine.

In some examples, generating the quorum token is further based at least in part on the plurality of signatures representing at least a threshold number of pools of a total number of pools. In some examples, a private key of the plurality of private keys and a corresponding respective public key of the plurality of public keys are stored on a portable hardware device. In some examples, the portable hardware device is configured to refrain from transmitting the private key off the portable hardware device.

In some examples, the certificate comprises a client authentication certificate. In some examples, the root key corresponds to a private key of an RSA key pair comprising the private key and a corresponding public key. In some examples, each private key of the plurality of private keys and each corresponding respective public key of the plurality of public keys comprises an elliptic curve key pair.

Figure 20:
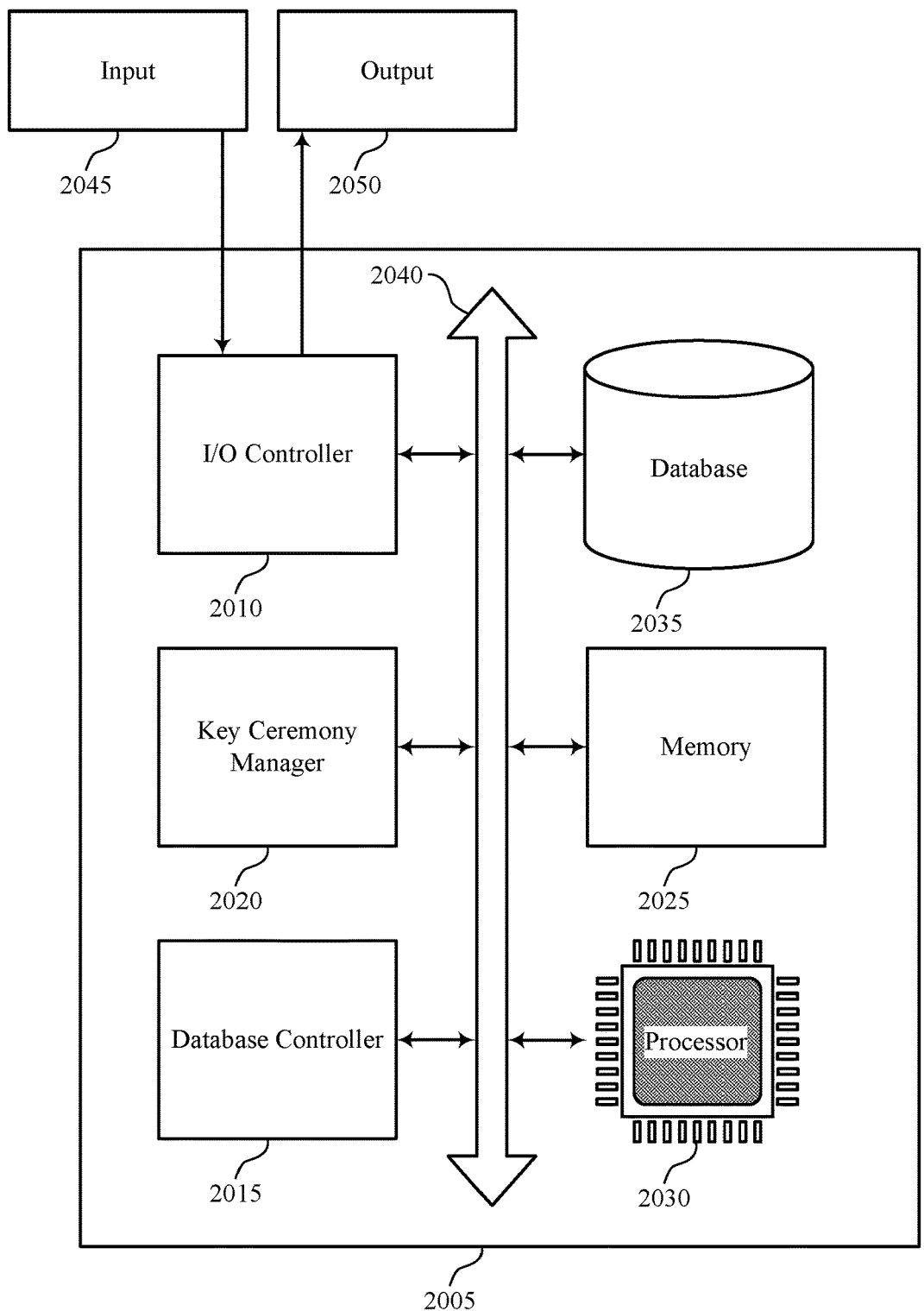
FIG. 20 shows a diagram of a system including a device that supports techniques for virtual cryptographic key ceremonies in accordance with aspects of the present disclosure.

FIG. 20 shows a diagram of a system 2000 including a device 2005 that supports techniques for virtual cryptographic key ceremonies in accordance with aspects of the present disclosure. The device 2005 may be an example of or include the components of a device 1805 as described herein. The device 2005 may include components for bi-directional voice and data communications including components for transmitting and receiving communications, such as a key ceremony manager 2020, an I/O controller 2010, a database controller 2015, a memory 2025, a processor 2030, and a database 2035. These components may be in electronic communication or otherwise coupled (e.g., operatively, communicatively, functionally, electronically, electrically) via one or more buses (e.g., a bus 2040).

The I/O controller 2010 may manage input signals 2045 and output signals 2050 for the device 2005. The I/O controller 2010 may also manage peripherals not integrated into the device 2005. In some cases, the I/O controller 2010 may represent a physical connection or port to an external peripheral. In some cases, the I/O controller 2010 may utilize an operating system such as iOS®, ANDROID®, MS-DOS®, MS-WINDOWS®, OS/2®, UNIX®, LINUX®, or another known operating system. In other cases, the I/O controller 2010 may represent or interact with a modem, a keyboard, a mouse, a touchscreen, or a similar device. In some cases, the I/O controller 2010 may be implemented as part of a processor. In some cases, a user may interact with the device 2005 via the I/O controller 2010 or via hardware components controlled by the I/O controller 2010.

The database controller 2015 may manage data storage and processing in a database 2035. In some cases, a user may interact with the database controller 2015. In other cases, the database controller 2015 may operate automatically without user interaction. The database 2035 may be an example of a single database, a distributed database, multiple distributed databases, a data store, a data lake, or an emergency backup database.

Memory 2025 may include random-access memory (RAM) and ROM. The memory 2025 may store computer-readable, computer-executable software including instructions that, when executed, cause the processor to perform various functions described herein. In some cases, the memory 2025 may contain, among other things, a basic input/output system (BIOS) which may control basic hardware or software operation such as the interaction with peripheral components or devices.

The processor 2030 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2030 may be configured to operate a memory array using a memory controller. In other cases, a memory controller may be integrated into the processor 2030. The processor 2030 may be configured to execute computer-readable instructions stored in a memory 2025 to perform various functions (e.g., functions or tasks supporting techniques for virtual cryptographic key ceremonies).

The key ceremony manager 2020 may support encryption key management in accordance with examples as disclosed herein. For example, the key ceremony manager 2020 may be configured as or otherwise support a means for receiving a plurality of public keys and a plurality of signatures, wherein the plurality of signatures comprise data encrypted using a plurality of private keys, and wherein each private key of the plurality of private keys corresponds to a respective public key of the plurality of public keys. The key ceremony manager 2020 may be configured as or otherwise support a means for generating a quorum token based at least in part on the plurality of signatures and the plurality of public keys, wherein generating the quorum token is based at least in part on the plurality of signatures representing at least a threshold number of pools. The key ceremony manager 2020 may be configured as or otherwise support a means for receiving a plurality of encrypted shares, wherein each encrypted share of the plurality of encrypted shares is associated with a respective pool of the plurality of pools. The key ceremony manager 2020 may be configured as or otherwise support a means for generating a master wrapping key based at least in part on generating the quorum token and receiving the plurality of encrypted shares. The key ceremony manager 2020 may be configured as or otherwise support a means for unwrapping a root key using the master wrapping key. The key ceremony manager 2020 may be configured as or otherwise support a means for generating a certificate based at least in part on the root key.

By including or configuring the key ceremony manager 2020 in accordance with examples as described herein, the device 2005 may support techniques for improved cryptographic key integrity and device security.

Figure 21:
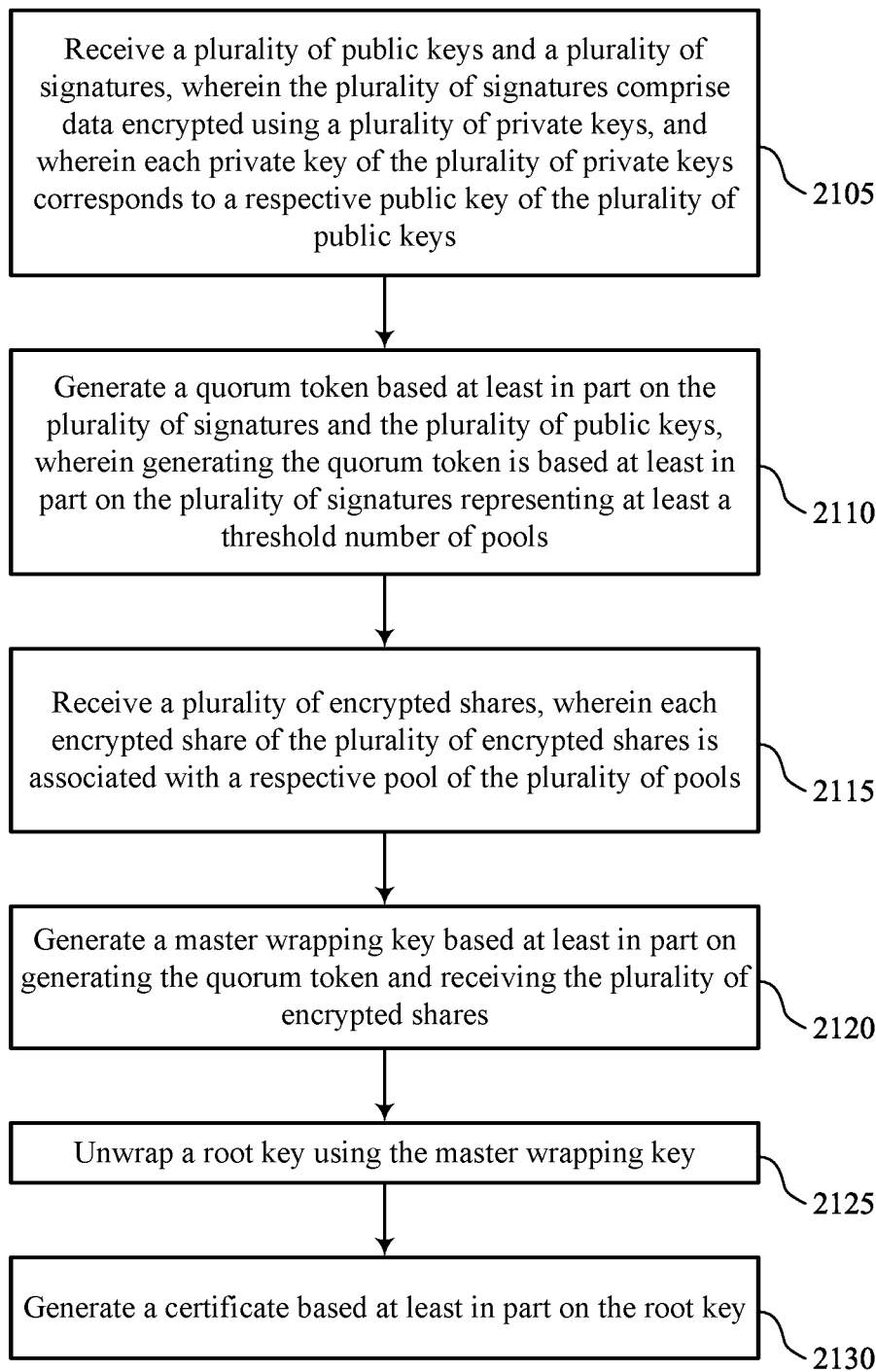
FIGS. 21 through 23 show flowcharts illustrating methods that support techniques for virtual cryptographic key ceremonies in accordance with aspects of the present disclosure.

FIG. 21 shows a flowchart illustrating a method 2100 that supports techniques for virtual cryptographic key ceremonies in accordance with aspects of the present disclosure. The operations of the method 2100 may be implemented by a server or its components as described herein. For example, the operations of the method 2100 may be performed by a server as described with reference to FIGS. 1 through 20. In some examples, a server may execute a set of instructions to control the functional elements of the server to perform the described functions. Additionally or alternatively, the server may perform aspects of the described functions using special-purpose hardware.

At 2105, the method may include receiving a plurality of public keys and a plurality of signatures, wherein the plurality of signatures comprise data encrypted using a plurality of private keys, and wherein each private key of the plurality of private keys corresponds to a respective public key of the plurality of public keys. The operations of 2105 may be performed in accordance with examples as disclosed herein. In some examples, aspects of the operations of 2105 may be performed by a signature component 1925 as described with reference to FIG. 19.

At 2110, the method may include generating a quorum token based at least in part on the plurality of signatures and the plurality of public keys, wherein generating the quorum token is based at least in part on the plurality of signatures representing at least a threshold number of pools. The operations of 2110 may be performed in accordance with examples as disclosed herein. In some examples, aspects of the operations of 2110 may be performed by a quorum token component 1930 as described with reference to FIG. 19.

At 2115, the method may include receiving a plurality of encrypted shares, wherein each encrypted share of the plurality of encrypted shares is associated with a respective pool of the plurality of pools. The operations of 2115 may be performed in accordance with examples as disclosed herein. In some examples, aspects of the operations of 2115 may be performed by a share component 1935 as described with reference to FIG. 19.

At 2120, the method may include generating a master wrapping key based at least in part on generating the quorum token and receiving the plurality of encrypted shares. The operations of 2120 may be performed in accordance with examples as disclosed herein. In some examples, aspects of the operations of 2120 may be performed by a wrapping key component 1940 as described with reference to FIG. 19.

At 2125, the method may include unwrapping a root key using the master wrapping key. The operations of 2125 may be performed in accordance with examples as disclosed herein. In some examples, aspects of the operations of 2125 may be performed by a root key component 1945 as described with reference to FIG. 19.

At 2130, the method may include generating a certificate based at least in part on the root key. The operations of 2130 may be performed in accordance with examples as disclosed herein. In some examples, aspects of the operations of 2130 may be performed by a root key component 1945 as described with reference to FIG. 19.

Figure 22:
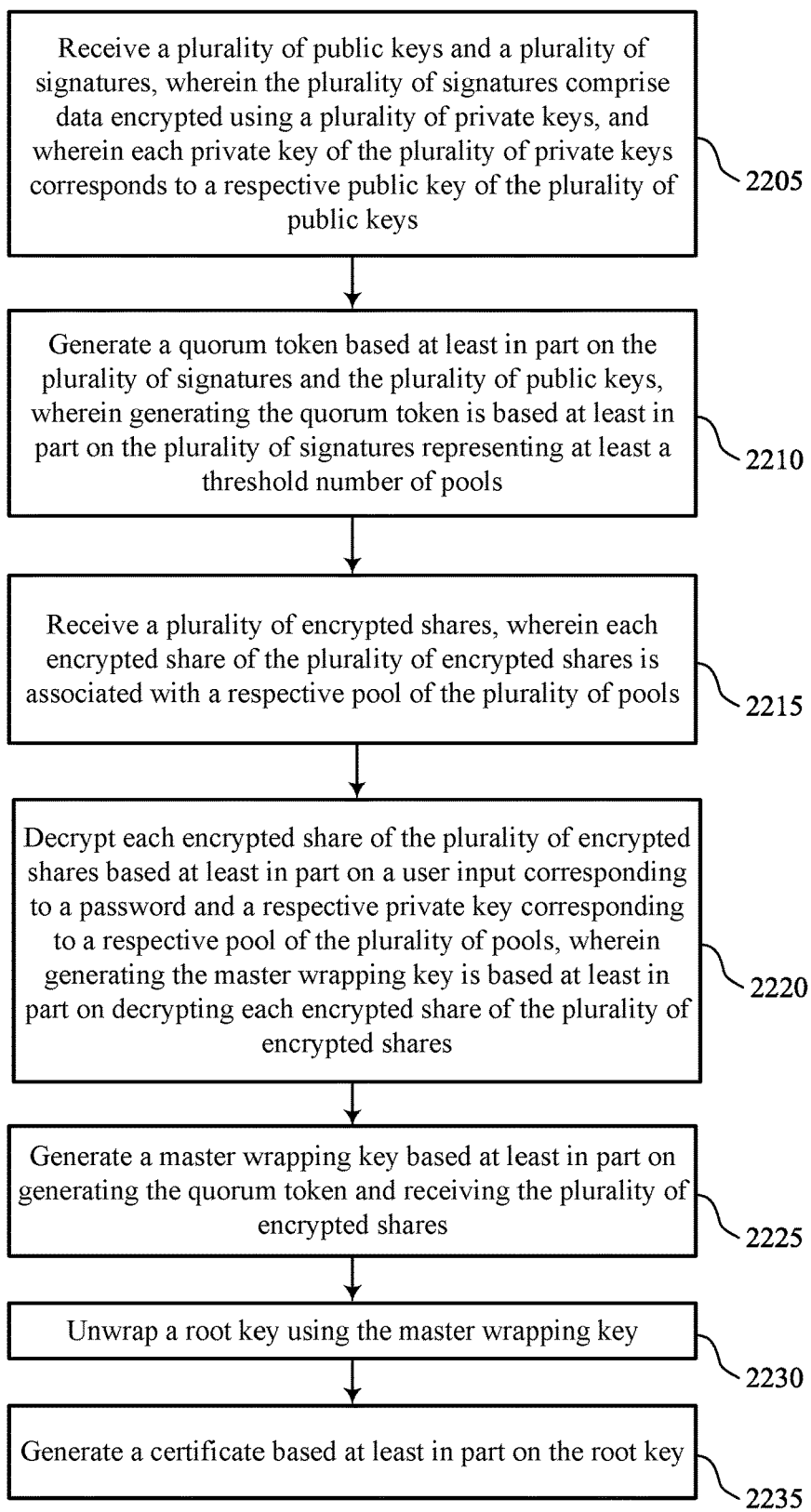

FIG. 22 shows a flowchart illustrating a method 2200 that supports techniques for virtual cryptographic key ceremonies in accordance with aspects of the present disclosure.

The operations of the method 2200 may be implemented by a server or its components as described herein. For example, the operations of the method 2200 may be performed by a server as described with reference to FIGS. 1 through 20. In some examples, a server may execute a set of instructions to control the functional elements of the server to perform the described functions. Additionally or alternatively, the server may perform aspects of the described functions using special-purpose hardware.

At 2205, the method may include receiving a plurality of public keys and a plurality of signatures, wherein the plurality of signatures comprise data encrypted using a plurality of private keys, and wherein each private key of the plurality of private keys corresponds to a respective public key of the plurality of public keys. The operations of 2205 may be performed in accordance with examples as disclosed herein. In some examples, aspects of the operations of 2205 may be performed by a signature component 1925 as described with reference to FIG. 19.

At 2210, the method may include generating a quorum token based at least in part on the plurality of signatures and the plurality of public keys, wherein generating the quorum token is based at least in part on the plurality of signatures representing at least a threshold number of pools. The operations of 2210 may be performed in accordance with examples as disclosed herein. In some examples, aspects of the operations of 2210 may be performed by a quorum token component 1930 as described with reference to FIG. 19.

At 2215, the method may include receiving a plurality of encrypted shares, wherein each encrypted share of the plurality of encrypted shares is associated with a respective pool of the plurality of pools. The operations of 2215 may be performed in accordance with examples as disclosed herein. In some examples, aspects of the operations of 2215 may be performed by a share component 1935 as described with reference to FIG. 19.

At 2220, the method may include decrypting each encrypted share of the plurality of encrypted shares based at least in part on a user input corresponding to a password and a respective private key corresponding to a respective pool of the plurality of pools, wherein generating the master wrapping key is based at least in part on decrypting each encrypted share of the plurality of encrypted shares. The operations of 2220 may be performed in accordance with examples as disclosed herein. In some examples, aspects of the operations of 2220 may be performed by a share decryption component 1950 as described with reference to FIG. 19.

At 2225, the method may include generating a master wrapping key based at least in part on generating the quorum token and receiving the plurality of encrypted shares. The operations of 2225 may be performed in accordance with examples as disclosed herein. In some examples, aspects of the operations of 2225 may be performed by a wrapping key component 1940 as described with reference to FIG. 19.

At 2230, the method may include unwrapping a root key using the master wrapping key. The operations of 2230 may be performed in accordance with examples as disclosed herein. In some examples, aspects of the operations of 2230 may be performed by a root key component 1945 as described with reference to FIG. 19.

At 2235, the method may include generating a certificate based at least in part on the root key. The operations of 2235 may be performed in accordance with examples as disclosed herein. In some examples, aspects of the operations of 2235 may be performed by a root key component 1945 as described with reference to FIG. 19.

Figure 23:
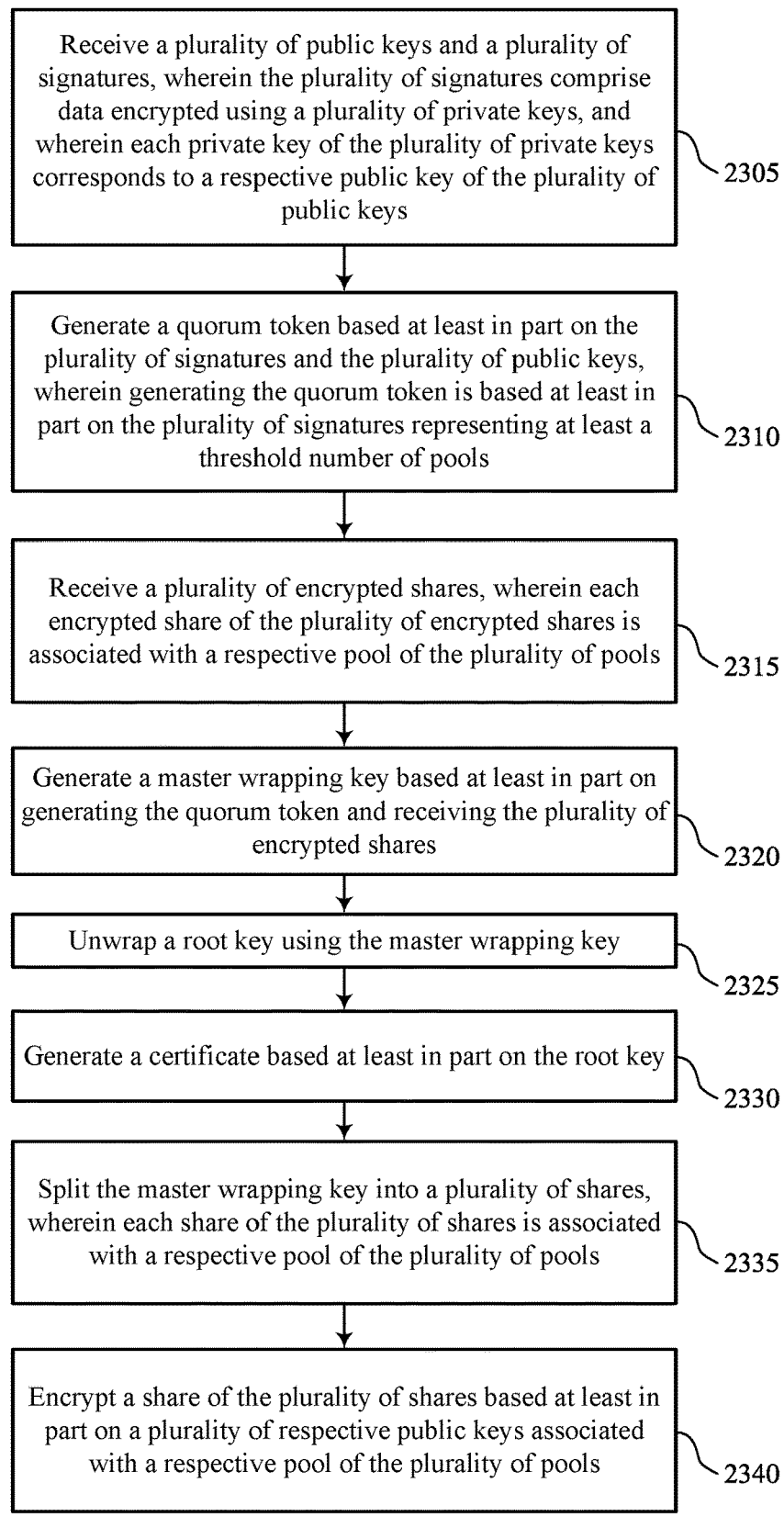

FIG. 23 shows a flowchart illustrating a method 2300 that supports techniques for virtual cryptographic key ceremonies in accordance with aspects of the present disclosure. The operations of the method 2300 may be implemented by a server or its components as described herein. For example, the operations of the method 2300 may be performed by a server as described with reference to FIGS. 1 through 20. In some examples, a server may execute a set of instructions to control the functional elements of the server to perform the described functions. Additionally or alternatively, the server may perform aspects of the described functions using special-purpose hardware.

At 2305, the method may include receiving a plurality of public keys and a plurality of signatures, wherein the plurality of signatures comprise data encrypted using a plurality of private keys, and wherein each private key of the plurality of private keys corresponds to a respective public key of the plurality of public keys. The operations of 2305 may be performed in accordance with examples as disclosed herein. In some examples, aspects of the operations of 2305 may be performed by a signature component 1925 as described with reference to FIG. 19.

At 2310, the method may include generating a quorum token based at least in part on the plurality of signatures and the plurality of public keys, wherein generating the quorum token is based at least in part on the plurality of signatures representing at least a threshold number of pools. The operations of 2310 may be performed in accordance with examples as disclosed herein. In some examples, aspects of the operations of 2310 may be performed by a quorum token component 1930 as described with reference to FIG. 19.

At 2315, the method may include receiving a plurality of encrypted shares, wherein each encrypted share of the plurality of encrypted shares is associated with a respective pool of the plurality of pools. The operations of 2315 may be performed in accordance with examples as disclosed herein. In some examples, aspects of the operations of 2315 may be performed by a share component 1935 as described with reference to FIG. 19.

At 2320, the method may include generating a master wrapping key based at least in part on generating the quorum token and receiving the plurality of encrypted shares. The operations of 2320 may be performed in accordance with examples as disclosed herein. In some examples, aspects of the operations of 2320 may be performed by a wrapping key component 1940 as described with reference to FIG. 19.

At 2325, the method may include unwrapping a root key using the master wrapping key. The operations of 2325 may be performed in accordance with examples as disclosed herein. In some examples, aspects of the operations of 2325 may be performed by a root key component 1945 as described with reference to FIG. 19.

At 2330, the method may include generating a certificate based at least in part on the root key. The operations of 2330 may be performed in accordance with examples as disclosed herein. In some examples, aspects of the operations of 2330 may be performed by a root key component 1945 as described with reference to FIG. 19.

At 2335, the method may include splitting the master wrapping key into a plurality of shares, wherein each share of the plurality of shares is associated with a respective pool of the plurality of pools. The operations of 2335 may be performed in accordance with examples as disclosed herein. In some examples, aspects of the operations of 2335 may be performed by a wrapping key component 1940 as described with reference to FIG. 19.

At 2340, the method may include encrypting a share of the plurality of shares based at least in part on a plurality of respective public keys associated with a respective pool of the plurality of pools. The operations of 2340 may be performed in accordance with examples as disclosed herein. In some examples, aspects of the operations of 2340 may be performed by a share encryption component 1955 as described with reference to FIG. 19.

A method for encryption key management is described. The method may include receiving a plurality of public keys and a plurality of signatures, wherein the plurality of signatures comprise data encrypted using a plurality of private keys, and wherein each private key of the plurality of private keys corresponds to a respective public key of the plurality of public keys, generating a quorum token based at least in part on the plurality of signatures and the plurality of public keys, wherein generating the quorum token is based at least in part on the plurality of signatures representing at least a threshold number of pools, receiving a plurality of encrypted shares, wherein each encrypted share of the plurality of encrypted shares is associated with a respective pool of the plurality of pools, generating a master wrapping key based at least in part on generating the quorum token and receiving the plurality of encrypted shares, unwrapping a root key using the master wrapping key, and generating a certificate based at least in part on the root key.

An apparatus for encryption key management is described. The apparatus may include a processor, memory in electronic communication with the processor, and instructions stored in the memory. The instructions may be executable by the processor to cause the apparatus to receive a plurality of public keys and a plurality of signatures, wherein the plurality of signatures comprise data encrypted using a plurality of private keys, and wherein each private key of the plurality of private keys corresponds to a respective public key of the plurality of public keys, generate a quorum token based at least in part on the plurality of signatures and the plurality of public keys, wherein generating the quorum token is based at least in part on the plurality of signatures representing at least a threshold number of pools, receive a plurality of encrypted shares, wherein each encrypted share of the plurality of encrypted shares is associated with a respective pool of the plurality of pools, generate a master wrapping key based at least in part on generating the quorum token and receiving the plurality of encrypted shares, unwrap a root key using the master wrapping key, and generate a certificate based at least in part on the root key.

Another apparatus for encryption key management is described. The apparatus may include means for receiving a plurality of public keys and a plurality of signatures, wherein the plurality of signatures comprise data encrypted using a plurality of private keys, and wherein each private key of the plurality of private keys corresponds to a respective public key of the plurality of public keys, means for generating a quorum token based at least in part on the plurality of signatures and the plurality of public keys, wherein generating the quorum token is based at least in part on the plurality of signatures representing at least a threshold number of pools, means for receiving a plurality of encrypted shares, wherein each encrypted share of the plurality of encrypted shares is associated with a respective pool of the plurality of pools, means for generating a master wrapping key based at least in part on generating the quorum token and receiving the plurality of encrypted shares, means for unwrapping a root key using the master wrapping key, and means for generating a certificate based at least in part on the root key.

A non-transitory computer-readable medium storing code for encryption key management is described. The code may include instructions executable by a processor to receive a plurality of public keys and a plurality of signatures, wherein the plurality of signatures comprise data encrypted using a plurality of private keys, and wherein each private key of the plurality of private keys corresponds to a respective public key of the plurality of public keys, generate a quorum token based at least in part on the plurality of signatures and the plurality of public keys, wherein generating the quorum token is based at least in part on the plurality of signatures representing at least a threshold number of pools, receive a plurality of encrypted shares, wherein each encrypted share of the plurality of encrypted shares is associated with a respective pool of the plurality of pools, generate a master wrapping key based at least in part on generating the quorum token and receiving the plurality of encrypted shares, unwrap a root key using the master wrapping key, and generate a certificate based at least in part on the root key.

Some examples of the method, apparatuses, and non-transitory computer-readable medium described herein may further include operations, features, means, or instructions for decrypting each encrypted share of the plurality of encrypted shares based at least in part on a user input corresponding to a password and a respective private key corresponding to a respective pool of the plurality of pools, wherein generating the master wrapping key may be based at least in part on decrypting each encrypted share of the plurality of encrypted shares.

Some examples of the method, apparatuses, and non-transitory computer-readable medium described herein may further include operations, features, means, or instructions for storing the master wrapping key in volatile memory such that a system reboot results in destruction of the master wrapping key.

Some examples of the method, apparatuses, and non-transitory computer-readable medium described herein may further include operations, features, means, or instructions for splitting the master wrapping key into a plurality of shares, wherein each share of the plurality of shares may be associated with a respective pool of the plurality of pools and encrypting a share of the plurality of shares based at least in part on a plurality of respective public keys associated with a respective pool of the plurality of pools.

In some examples of the method, apparatuses, and non-transitory computer-readable medium described herein, encrypting each share of the plurality of shares may include operations, features, means, or instructions for generating a symmetric cryptographic key based at least in part on the plurality of respective public keys associated with the respective pool of the plurality of pools and encrypting the share of the plurality of shares using the symmetric cryptographic key.

Some examples of the method, apparatuses, and non-transitory computer-readable medium described herein may further include operations, features, means, or instructions for generating a signature for each share of the plurality of shares using a respective private key corresponding to a pool of the plurality of pools.

Some examples of the method, apparatuses, and non-transitory computer-readable medium described herein may further include operations, features, means, or instructions for splitting the master wrapping key comprises a Shamir's secret sharing scheme.

In some examples of the method, apparatuses, and non-transitory computer-readable medium described herein, generating the quorum token may include operations, features, means, or instructions for a command line interface program verifying that the plurality of signatures represent at least the threshold number of pools.

Some examples of the method, apparatuses, and non-transitory computer-readable medium described herein may further include operations, features, means, or instructions for generating a log file based at least in part on generating the quorum token and receiving the plurality of encrypted shares, wherein the log file includes a video recording and signing the log file with each private key of the plurality of private keys.

Some examples of the method, apparatuses, and non-transitory computer-readable medium described herein may further include operations, features, means, or instructions for running a virtual machine, wherein generating the master wrapping key comprises generating the master wrapping key on the virtual machine.

Some examples of the method, apparatuses, and non-transitory computer-readable medium described herein may further include operations, features, means, or instructions for terminating the virtual machine, wherein terminating the virtual machine flushes volatile memory associated with the virtual machine.

Some examples of the method, apparatuses, and non-transitory computer-readable medium described herein may further include operations, features, means, or instructions for generating the quorum token may be further based at least in part on the plurality of signatures representing at least a threshold number of pools of a total number of pools.

In some examples of the method, apparatuses, and non-transitory computer-readable medium described herein, a private key of the plurality of private keys and a corresponding respective public key of the plurality of public keys may be stored on a portable hardware device, and the portable hardware device may be configured to refrain from transmitting the private key off the portable hardware device.

In some examples of the method, apparatuses, and non-transitory computer-readable medium described herein, the certificate comprises a client authentication certificate.

In some examples of the method, apparatuses, and non-transitory computer-readable medium described herein, the root key corresponds to a private key of an RSA key pair comprising the private key and a corresponding public key.

In some examples of the method, apparatuses, and non-transitory computer-readable medium described herein, each private key of the plurality of private keys and each corresponding respective public key of the plurality of public keys comprises an elliptic curve key pair It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for encryption key management, comprising:
   receiving a plurality of public keys and a plurality of signatures, wherein the plurality of signatures comprise data encrypted using a plurality of private keys, and wherein each private key of the plurality of private keys corresponds to a respective public key of the plurality of public keys;
   generating a quorum token based at least in part on the plurality of signatures and the plurality of public keys, wherein generating the quorum token is based at least in part on the plurality of signatures, and wherein the plurality of signatures represents at least a threshold number of pools of a plurality of pools;
   receiving a plurality of encrypted shares, wherein each encrypted share of the plurality of encrypted shares is associated with a respective pool of the plurality of pools;
   generating a master wrapping key based at least in part on the quorum token and the plurality of encrypted shares;
   unwrapping a root key using the master wrapping key; and
   generating a certificate based at least in part on the root key.

2. The method of claim 1, further comprising:
   decrypting each encrypted share of the plurality of encrypted shares based at least in part on a user input corresponding to a password and a respective private key corresponding to the respective pool of the plurality of pools, wherein generating the master wrapping key is based at least in part on decrypting each encrypted share of the plurality of encrypted shares.

3. The method of claim 1, further comprising:
   storing the master wrapping key in volatile memory such that a system reboot results in destruction of the master wrapping key.

4. The method of claim 1, further comprising:
   splitting the master wrapping key into a plurality of shares, wherein each share of the plurality of shares is associated with the respective pool of the plurality of pools; and
   encrypting a share of the plurality of shares based at least in part on a plurality of respective public keys associated with the respective pool of the plurality of pools.

5. The method of claim 4, wherein encrypting each share of the plurality of shares comprises:
   generating a symmetric cryptographic key based at least in part on the plurality of respective public keys associated with the respective pool of the plurality of pools; and
   encrypting the share of the plurality of shares using the symmetric cryptographic key.

6. The method of claim 4, further comprising:
   generating a signature for each share of the plurality of shares using a respective private key corresponding to a pool of the plurality of pools.

7. The method of claim 4, wherein splitting the master wrapping key comprises a Shamir's secret sharing scheme.

8. The method of claim 1, wherein generating the quorum token further comprises:
   a command line interface program verifying that the plurality of signatures represent at least the threshold number of pools.

9. The method of claim 1, further comprising: generating a log file based at least in part on the quorum token and the plurality of encrypted shares, wherein the log file includes a video recording; and signing the log file with each private key of the plurality of private keys.

10. The method of claim 1, further comprising:
    running a virtual machine, wherein generating the master wrapping key comprises generating the master wrapping key on the virtual machine.

11. The method of claim 10, further comprising:
    terminating the virtual machine, wherein terminating the virtual machine flushes volatile memory associated with the virtual machine.

12. The method of claim 1, wherein generating the quorum token is further based at least in part on the plurality of signatures representing at least the threshold number of pools.

13. The method of claim 1, wherein a private key of the plurality of private keys and a corresponding respective public key of the plurality of public keys are stored on a portable hardware device, and the portable hardware device is configured to refrain from transmitting the private key off the portable hardware device.

14. The method of claim 1, wherein the certificate comprises a client authentication certificate.

15. The method of claim 1, wherein the root key corresponds to a private key of a Rivest Shamir Adleman (RSA) key pair comprising the private key and a corresponding public key.

16. The method of claim 1, wherein each private key of the plurality of private keys and each corresponding respective public key of the plurality of public keys comprises an elliptic curve key pair.

17. An apparatus for encryption key management, comprising:
a processor;
memory coupled with the processor; and
instructions stored in the memory and executable by the processor to cause the apparatus to:
receive a plurality of public keys and a plurality of signatures, wherein the plurality of signatures comprise data encrypted using a plurality of private keys, and wherein each private key of the plurality of private keys corresponds to a respective public key of the plurality of public keys;
generate a quorum token based at least in part on the plurality of signatures and the plurality of public keys, wherein generating the quorum token is based at least in part on the plurality of signatures, and wherein the plurality of signatures represents at least a threshold number of pools of a plurality of pools;
receive a plurality of encrypted shares, wherein each encrypted share of the plurality of encrypted shares is associated with a respective pool of the plurality of pools;
generate a master wrapping key based at least in part on the quorum token and the plurality of encrypted shares;
unwrap a root key using the master wrapping key; and
generate a certificate based at least in part on the root key.

18. The apparatus of claim 17, wherein the instructions are further executable by the processor to cause the apparatus to:
decrypt each encrypted share of the plurality of encrypted shares based at least in part on a user input corresponding to a password and a respective private key corresponding to the respective pool of the plurality of pools, wherein generating the master wrapping key is based at least in part on decrypting each encrypted share of the plurality of encrypted shares.

19. The apparatus of claim 17, wherein the instructions are further executable by the processor to cause the apparatus to:
split the master wrapping key into a plurality of shares, wherein each share of the plurality of shares is associated with the respective pool of the plurality of pools; and
encrypt a share of the plurality of shares based at least in part on a plurality of respective public keys associated with the respective pool of the plurality of pools.

20. A non-transitory computer-readable medium storing code for encryption key management, the code comprising instructions executable by a processor to:
receive a plurality of public keys and a plurality of signatures, wherein the plurality of signatures comprise data encrypted using a plurality of private keys, and wherein each private key of the plurality of private keys corresponds to a respective public key of the plurality of public keys;
generate a quorum token based at least in part on the plurality of signatures and the plurality of public keys, wherein generating the quorum token is based at least in part on the plurality of signatures, and wherein the plurality of signatures represents at least a threshold number of pools of a plurality of pools;
receive a plurality of encrypted shares, wherein each encrypted share of the plurality of encrypted shares is associated with a respective pool of the plurality of pools;
generate a master wrapping key based at least in part on the quorum token and the plurality of encrypted shares;
unwrap a root key using the master wrapping key; and
generate a certificate based at least in part on the root key.

* * * * *